(12) United States Patent
Weber

(10) Patent No.: US 12,043,571 B2
(45) Date of Patent: *Jul. 23, 2024

(54) ELECTRONIC DEVICE HAVING SELECTIVELY STRENGTHENED GLASS

(71) Applicant: Apple Inc., Cupertino, CA (US)

(72) Inventor: Douglas J. Weber, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,891

(22) Filed: Dec. 1, 2022

(65) Prior Publication Data

US 2023/0107600 A1 Apr. 6, 2023

Related U.S. Application Data

(63) Continuation of application No. 16/878,393, filed on May 19, 2020, now Pat. No. 11,518,708, which is a continuation of application No. 15/660,839, filed on Jul. 26, 2017, now Pat. No. 10,676,393, which is a continuation of application No. 13/235,090, filed on Sep. 16, 2011, now Pat. No. 9,725,359.

(60) Provisional application No. 61/453,404, filed on Mar. 16, 2011.

(51) Int. Cl.
*C03C 21/00* (2006.01)
*B32B 17/06* (2006.01)

(52) U.S. Cl.
CPC ............ *C03C 21/003* (2013.01); *B32B 17/06* (2013.01); *B32B 2457/20* (2013.01); *C03C 21/001* (2013.01); *C03C 21/002* (2013.01); *C03C 21/005* (2013.01); *C09K 2323/00* (2020.08)

(58) Field of Classification Search
None
See application file for complete search history.

(56) References Cited

U.S. PATENT DOCUMENTS

| | | |
|---|---|---|
| 2,643,020 A | 6/1953 | Dalton |
| 3,415,637 A | 12/1968 | Glynn |
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |

(Continued)

FOREIGN PATENT DOCUMENTS

| | | |
|---|---|---|
| AT | 283630 | 8/1970 |
| CN | 1277090 | 12/2000 |

(Continued)

OTHER PUBLICATIONS

Aben, "Laboratory of Photoelasticity," Institute of Cybernetics at TTU, www.ioc.ee/res/photo.html, Oct. 5, 2000.

(Continued)

*Primary Examiner* — Anthony J Frost
(74) *Attorney, Agent, or Firm* — Brownstein Hyatt Farber Schreck, LLP

(57) ABSTRACT

Embodiments disclosed therein generally pertain to selectively strengthening glass. More particularly, techniques are described for selectively strengthening cover glass, which tends to be thin, for electronic devices, namely, portable electronic devices.

20 Claims, 15 Drawing Sheets

(56) References Cited

U.S. PATENT DOCUMENTS

| | | |
|---|---|---|
| 3,619,240 A | 11/1971 | Toussaint et al. |
| 3,626,723 A | 12/1971 | Plumat |
| 3,652,244 A | 3/1972 | Plumat |
| 3,753,840 A | 8/1973 | Plumat |
| 3,798,013 A | 3/1974 | Inoue et al. |
| 3,843,472 A | 10/1974 | Toussaint et al. |
| 3,857,689 A | 12/1974 | Koizumi et al. |
| 3,926,605 A | 12/1975 | Kunkle |
| 3,951,707 A | 4/1976 | Kurtz et al. |
| 4,015,045 A | 3/1977 | Rinehart |
| 4,052,184 A | 10/1977 | Anderson |
| 4,119,760 A | 10/1978 | Rinehart |
| 4,156,755 A | 5/1979 | Rinehart |
| 4,165,228 A | 8/1979 | Ebata et al. |
| 4,148,082 A | 12/1979 | Ganswein et al. |
| 4,212,919 A | 7/1980 | Hoda |
| 4,218,230 A | 8/1980 | Hogan |
| 4,346,601 A | 8/1982 | France |
| 4,353,649 A | 10/1982 | Kishii |
| 4,425,810 A | 1/1984 | Simon et al. |
| 4,537,820 A | 8/1985 | Nowobliski et al. |
| 4,646,722 A | 7/1987 | Silverstein et al. |
| 4,733,973 A | 3/1988 | Machak et al. |
| 4,842,629 A | 6/1989 | Clemens et al. |
| 4,844,724 A | 7/1989 | Sakai et al. |
| 4,846,868 A | 7/1989 | Aratani |
| 4,849,002 A | 7/1989 | Rapp |
| 4,872,896 A | 10/1989 | LaCourse et al. |
| 4,911,743 A | 3/1990 | Bagby |
| 4,937,129 A | 6/1990 | Yamazaki |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 5,041,173 A | 8/1991 | Shikata et al. |
| 5,104,435 A | 4/1992 | Oikawa et al. |
| 5,129,934 A | 7/1992 | Koss |
| 5,157,746 A | 10/1992 | Tobita et al. |
| 5,160,523 A | 11/1992 | Honkanen et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,411,563 A | 5/1995 | Yeh |
| 5,437,193 A | 8/1995 | Schleitweiler et al. |
| 5,445,871 A | 8/1995 | Murase et al. |
| 5,483,261 A | 1/1996 | Yasutaki |
| 5,488,204 A | 1/1996 | Mead et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,766,493 A | 6/1998 | Shin |
| 5,780,371 A | 7/1998 | Rifgi et al. |
| 5,816,225 A | 10/1998 | Koch et al. |
| 5,825,352 A | 10/1998 | Bisset et al. |
| 5,826,601 A | 10/1998 | Muraoka et al. |
| 5,835,079 A | 11/1998 | Shieh |
| 5,880,411 A | 3/1999 | Gillespie et al. |
| 5,930,047 A | 7/1999 | Gunz et al. |
| 5,953,094 A | 9/1999 | Matsuoka et al. |
| 5,985,014 A | 11/1999 | Ueda et al. |
| 6,050,870 A | 4/2000 | Suginoya et al. |
| 6,114,039 A | 9/2000 | Rifqui |
| 6,120,908 A | 9/2000 | Papanu et al. |
| 6,166,915 A | 12/2000 | Lake et al. |
| 6,188,391 B1 | 2/2001 | Seely et al. |
| 6,245,313 B1 | 6/2001 | Suzuki et al. |
| 6,287,674 B1 | 9/2001 | Verlinden et al. |
| 6,307,590 B1 | 10/2001 | Yoshida |
| 6,310,610 B1 | 10/2001 | Beaton et al. |
| 6,323,846 B1 | 11/2001 | Westerman et al. |
| 6,325,704 B1 | 12/2001 | Brown et al. |
| 6,327,011 B2 | 12/2001 | Kim |
| 6,350,664 B1 | 2/2002 | Haji et al. |
| 6,393,180 B1 | 5/2002 | Farries et al. |
| 6,429,840 B1 | 8/2002 | Sekiguchi |
| 6,437,867 B2 | 8/2002 | Zeylikovich et al. |
| 6,516,634 B1 | 2/2003 | Green et al. |
| 6,521,862 B1 | 2/2003 | Brannon |
| 6,621,542 B1 | 9/2003 | Aruga |
| 6,690,387 B2 | 2/2004 | Zimmerman et al. |
| 6,718,612 B2 | 4/2004 | Bajorek |
| 6,769,274 B2 | 8/2004 | Cho et al. |
| 6,772,610 B1 | 8/2004 | Albrand et al. |
| 6,810,688 B1 | 11/2004 | Duisit et al. |
| 6,936,741 B2 | 8/2005 | Munnig et al. |
| 6,955,971 B2 | 10/2005 | Ghyselen et al. |
| 6,996,324 B2 | 2/2006 | Hiraka et al. |
| 7,012,700 B2 | 3/2006 | De Groot et al. |
| 7,013,709 B2 | 3/2006 | Hajduk et al. |
| 7,015,894 B2 | 3/2006 | Morohoshi |
| 7,070,837 B2 | 7/2006 | Ross |
| 7,166,531 B1 | 1/2007 | van Den Hoek et al. |
| 7,184,064 B2 | 2/2007 | Zimmerman et al. |
| 7,461,564 B2 | 12/2008 | Glaesemann |
| 7,558,054 B1 | 7/2009 | Prest et al. |
| 7,626,807 B2 | 12/2009 | Hsu |
| 7,663,607 B2 | 2/2010 | Hotelling et al. |
| 7,810,355 B2 | 10/2010 | Feinstein et al. |
| 7,872,644 B2 | 1/2011 | Hong et al. |
| 7,918,019 B2 | 4/2011 | Chang et al. |
| 8,013,834 B2 | 9/2011 | Kim |
| 8,110,268 B2 | 2/2012 | Hegemier et al. |
| 8,111,248 B2 | 2/2012 | Lee et al. |
| 8,312,743 B2 | 11/2012 | Pun et al. |
| 8,391,010 B2 | 3/2013 | Rothkopf |
| 8,393,175 B2 | 3/2013 | Kohli et al. |
| 8,551,283 B2 | 10/2013 | Pakula et al. |
| 8,673,163 B2 | 3/2014 | Zhong |
| 8,684,613 B2 | 4/2014 | Weber et al. |
| 8,824,140 B2 | 9/2014 | Prest |
| 9,128,666 B2 | 9/2015 | Werner |
| 11,518,708 B2 * | 12/2022 | Weber .................... B32B 17/06 |
| 2002/0035853 A1 | 3/2002 | Brown et al. |
| 2002/0105793 A1 | 8/2002 | Oda |
| 2002/0155302 A1 | 10/2002 | Smith et al. |
| 2002/0157199 A1 | 10/2002 | Piltingsrud |
| 2003/0024274 A1 | 2/2003 | Cho et al. |
| 2003/0057183 A1 | 3/2003 | Cho et al. |
| 2003/0077453 A1 | 7/2003 | Oaku et al. |
| 2003/0234771 A1 | 12/2003 | Mulligan et al. |
| 2004/0051944 A1 | 3/2004 | Stark |
| 2004/0119701 A1 | 6/2004 | Mulligan et al. |
| 2004/0137828 A1 | 7/2004 | Takashashi et al. |
| 2004/0142118 A1 | 7/2004 | Takechi |
| 2004/0163414 A1 | 8/2004 | Eto et al. |
| 2005/0058423 A1 | 3/2005 | Brinkmann et al. |
| 2005/0105071 A1 | 5/2005 | Ishii |
| 2005/0135724 A1 | 6/2005 | Helvajian et al. |
| 2005/0174525 A1 | 8/2005 | Tsuboi |
| 2005/0193772 A1 | 9/2005 | Davidson et al. |
| 2005/0245165 A1 | 11/2005 | Harada et al. |
| 2005/0259438 A1 | 11/2005 | Mizutani |
| 2005/0285991 A1 | 12/2005 | Yamazaki |
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1 | 11/2006 | Bocko et al. |
| 2006/0268528 A1 | 11/2006 | Zadesky et al. |
| 2006/0292822 A1 | 12/2006 | Xie |
| 2006/0294420 A1 | 12/2006 | Schneider |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |

(56) References Cited

U.S. PATENT DOCUMENTS

| | | |
|---|---|---|
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135157 A1 | 6/2008 | Higuchi |
| 2008/0135175 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0011803 A1 | 1/2009 | Weber et al. |
| 2009/0046240 A1 | 2/2009 | Bolton |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 12/2009 | Wang et al. |
| 2009/0324899 A1* | 12/2009 | Feinstein ............... G06F 3/041 156/247 |
| 2009/0324939 A1 | 12/2009 | Feinstein et al. |
| 2010/0000259 A1 | 1/2010 | Ukrainczyk et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1* | 2/2010 | Barefoot ............... C03C 3/078 428/220 |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0210442 A1 | 8/2010 | Abramov et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Dinesh et al. |
| 2010/0321305 A1 | 12/2010 | Chang et al. |
| 2010/0328843 A1 | 12/2010 | Saruban et al. |
| 2011/0003619 A1 | 1/2011 | Fujii |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0067447 A1 | 1/2011 | Zadesky et al. |
| 2011/0030209 A1 | 2/2011 | Chang et al. |
| 2011/0050657 A1 | 3/2011 | Yamada |
| 2011/0063550 A1 | 3/2011 | Gettemy et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0027399 A1 | 2/2012 | Yeates |
| 2012/0227399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 | 9/2002 |
| CN | 1694589 | 11/2005 |
| CN | 101025502 | 8/2007 |
| CN | 101206314 | 6/2008 |
| CN | 102117104 | 7/2011 |
| CN | 102131357 | 7/2011 |
| CN | 101267509 | 8/2011 |
| CN | 1322339 | 11/2011 |
| CN | 102591576 | 7/2012 |
| CN | 202799425 | 3/2013 |
| CN | 103958423 | 7/2014 |
| DE | 1496586 | 6/1969 |
| DE | 1771268 | 12/1971 |
| DE | 3212612 | 10/1983 |
| DE | 10322350 | 12/2004 |
| EP | 1038663 | 9/2000 |
| EP | 1206422 | 11/2002 |
| EP | 1592073 | 11/2005 |
| EP | 1593658 | 11/2005 |
| EP | 2025556 | 2/2009 |
| EP | 2036867 | 3/2009 |
| EP | 2075237 | 7/2009 |
| EP | 2196870 | 6/2010 |
| EP | 2233447 | 9/2010 |
| EP | 2483216 | 8/2012 |
| EP | 2635540 | 9/2013 |
| FR | 2797627 | 2/2001 |
| FR | 2801302 | 5/2001 |
| GB | 1346747 | 2/1974 |
| JP | S42-011599 | 6/1963 |
| JP | S48006925 | 9/1973 |
| JP | S55031944 | 3/1980 |
| JP | S55-067529 | 5/1980 |
| JP | S55095645 | 7/1980 |
| JP | S55136979 | 10/1980 |
| JP | S55144450 | 11/1980 |
| JP | S59013638 | 1/1984 |
| JP | S59037451 | 2/1984 |
| JP | S61-097147 | 5/1986 |
| JP | 63060129 | 3/1988 |
| JP | AS63106617 | 5/1988 |
| JP | S63222234 | 9/1988 |
| JP | H05032431 | 2/1993 |
| JP | H05249422 | 9/1993 |
| JP | H06242260 | 9/1994 |
| JP | H07050144 | 2/1995 |
| JP | H08274054 | 10/1996 |
| JP | 52031757 | 3/1997 |
| JP | H09073072 | 3/1997 |
| JP | H09-507206 | 7/1997 |

(56) References Cited

FOREIGN PATENT DOCUMENTS

| | | |
|---|---|---|
| JP | H09312245 | 12/1997 |
| JP | 2001083887 | 9/1999 |
| JP | AH11281501 | 10/1999 |
| JP | A2000086261 | 3/2000 |
| JP | 2000163031 | 6/2000 |
| JP | 2002003895 | 7/2000 |
| JP | 2002160932 | 6/2002 |
| JP | 2002342033 | 11/2002 |
| JP | A2002338283 | 11/2002 |
| JP | 2003502257 | 1/2003 |
| JP | 2004094256 | 3/2004 |
| JP | A2004292247 | 10/2004 |
| JP | 2004339019 | 12/2004 |
| JP | 2005140901 | 6/2005 |
| JP | 2005156766 | 6/2005 |
| JP | 2005162549 | 6/2005 |
| JP | 2005353592 | 12/2005 |
| JP | A2000348338 | 12/2005 |
| JP | 2007099557 | 4/2007 |
| JP | 2008001590 | 1/2008 |
| JP | 2008007360 | 1/2008 |
| JP | 2008063166 | 3/2008 |
| JP | 2008066126 | 3/2008 |
| JP | 2008192194 | 8/2008 |
| JP | 2008195602 | 8/2008 |
| JP | 2008216938 | 9/2008 |
| JP | 2008306149 | 12/2008 |
| JP | A2009167086 | 7/2009 |
| JP | 2009230341 | 10/2009 |
| JP | 2009234856 | 10/2009 |
| JP | 2011158799 | 2/2010 |
| JP | 2010060908 | 3/2010 |
| JP | 2010064943 | 3/2010 |
| JP | 2010116276 | 5/2010 |
| JP | U3162733 | 8/2010 |
| JP | 2010195600 | 9/2010 |
| JP | 2011032124 | 2/2011 |
| JP | A2011032140 | 2/2011 |
| JP | 2011231009 | 11/2011 |
| JP | 2011527661 | 11/2011 |
| JP | 2013537723 | 10/2013 |
| KR | 20102006005920 | 1/2006 |
| KR | 20100019526 | 2/2010 |
| KR | 20110030919 | 3/2011 |
| TW | 201007521 | 2/2010 |
| TW | 201235744 | 9/2012 |
| WO | WO00/47529 | 8/2000 |
| WO | WO02/42838 | 5/2002 |
| WO | WO2004/014109 | 2/2004 |
| WO | WO2004/061806 | 7/2004 |
| WO | WO2004/106253 | 12/2004 |
| WO | WO2007/089054 | 8/2007 |
| WO | WO2008/044694 | 4/2008 |
| WO | WO2008/143999 | 11/2008 |
| WO | WO2009/003029 | 12/2008 |
| WO | WO2009/078406 | 6/2009 |
| WO | WO2009/099615 | 8/2009 |
| WO | WO2009/102326 | 8/2009 |
| WO | WO2009/125133 | 10/2009 |
| WO | WO2010/005578 | 1/2010 |
| WO | WO2010/014163 | 2/2010 |
| WO | WO2010/019829 | 2/2010 |
| WO | WO2010/080988 | 7/2010 |
| WO | WO2010/101961 | 9/2010 |
| WO | WO2011/008433 | 1/2011 |
| WO | WO2010/027565 | 2/2011 |
| WO | WO2011/041484 | 4/2011 |
| WO | WO2012/015960 | 2/2012 |
| WO | WO2012/027220 | 3/2012 |
| WO | WO2012/106280 | 8/2012 |
| WO | WO2013/106242 | 7/2013 |

OTHER PUBLICATIONS

Forooghian et al., Investigative Ophthalmology & Visual Science; Oct. 2008, vol. 49, No. 10.

Karlsson et al., "The Technology of Chemical Glass Strengthening—a Review," Apr. 2010, Glass Tecknology, European Journal of Glass Science and Technology A., vol. 51, No. 2, pp. 41-54.

Kingery et al., "Introduction to Ceramics," 2nd Ed., John Wiley & Sons, 1976, pp. 792 and 833-844.

Lee et al., "A Multi-Touch Three Dimensional Touch-Sensitive Tablet," Proceedings of CHI: ACM Conference on Human Factors in Computing Systems, Apr. 1985, pp. 21-25.

Mehrl et al., "Designer's Noticebook: Proximity Detection IR LED and Optical Crosstalk," http://ams.com/eng/content/view/download/145137, Aug. 1, 2011, 5 pages.

Ohkuma, "Development of a Manufacturing Process of a Thin, Lightweight LCD Cell," Department of Cell Process Development, IBM, Japan, Section 13.4.

Rubin, "The Automatic Recognition of Gestures," CMU-CS-91-202, Submitted in Partial Fulfillment of the Requirements of the Degree of Doctor of Philosophy in Computer Science at Carnegie Mellon University, Dec. 1991, 285 pages.

Rubin, "Combining Gestures and Direct Manipulation," CHI '92, May 1992, pp. 659-660.

Varshneya, Arun K., Chemical Strengthening of Glass: Lessons Learned and Yet to be Learned International Journal of Applied Glass Science, 2010, 1, 2, pp. 131-142.

Westerman, "Hand Tracking, Finger Identification and Chronic Manipulation of a Multi-Touch Surface," A Dissertation Submitted to the Faculty of the University of Delaware in Partial Fulfillment of the Requirements for the degree of Doctor of Philosophy in Electrical Engineering, Sprin 1999, 364 pages.

Chemically Strengthened Glass, Wikipedia, Apr. 19, 2009, http://en/wikipedia.org/w/index.php?title=Chemical_strengthened_glass&oldid=284794988.

"IPhone 4," Wikipedia, Jan. 4, 2012, 17 pages.

"Toward Making Smart Phone Touch-Screens More Glare and Smudge Resistant," e! Science News, http://esciencenews.com/articles/2009/08/19toard.making.smart.phone.touch.screen.s.more.glare.and.smudge.resistant, Aug. 19, 2009, 1 pg.

Wikipedia: "Iphone 4," www.wikipedia.org, retrieved Oct. 31, 2011, 15 pages.

\* cited by examiner

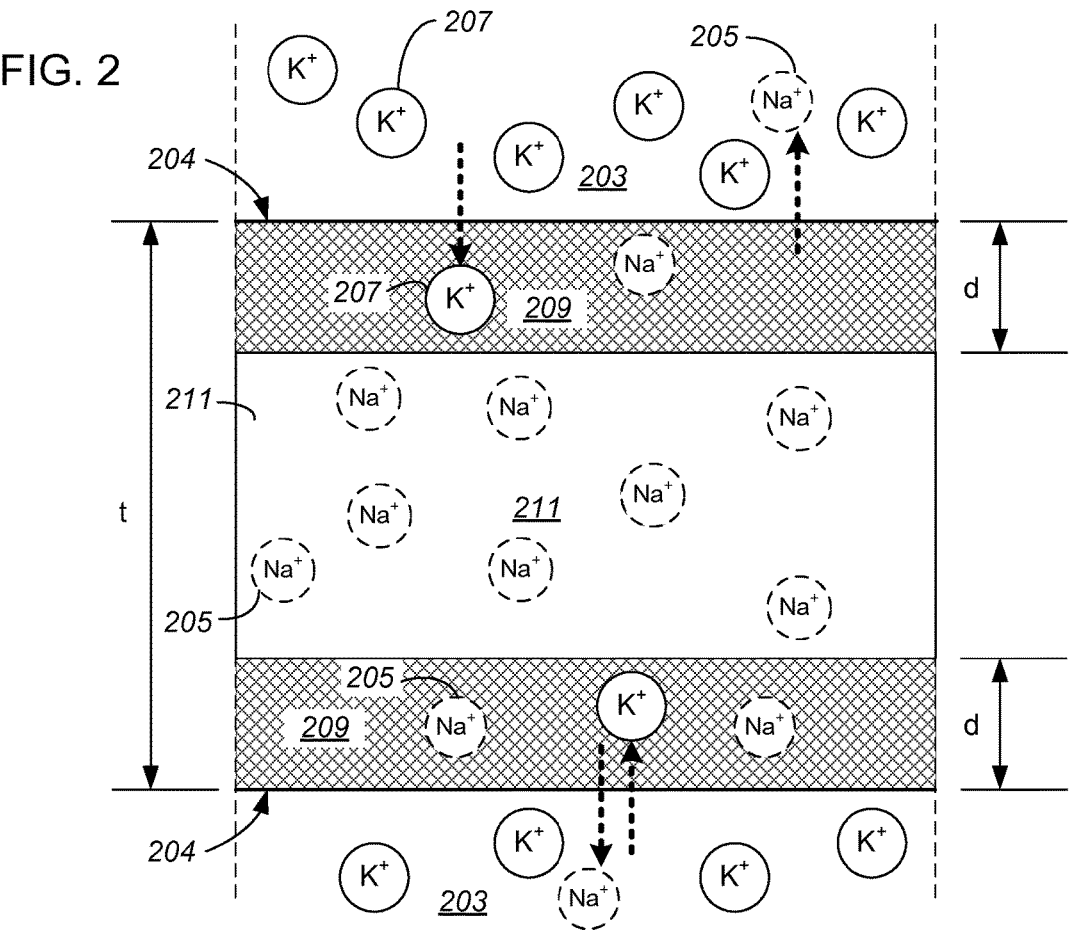
FIG. 2
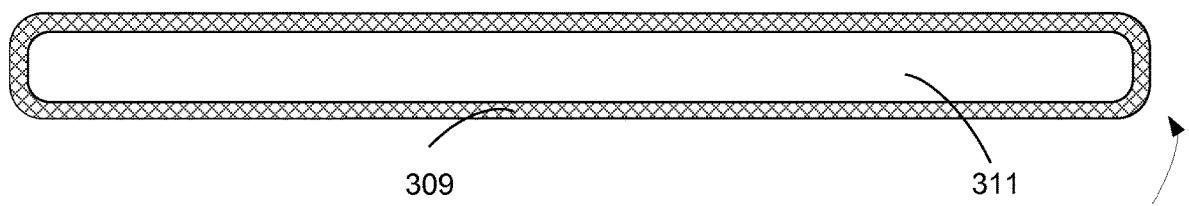
FIG. 3A
FIG. 3B

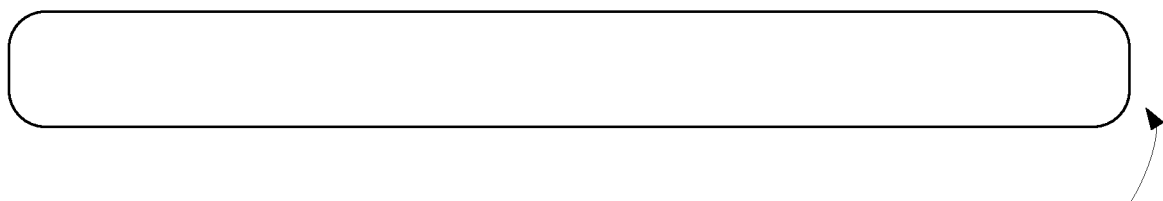
FIG. 5A    504
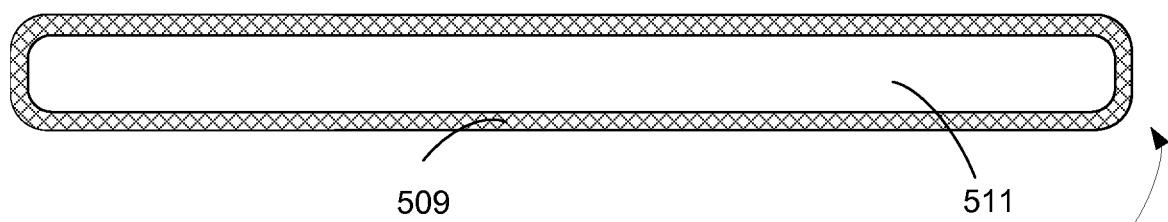
509    511
FIG. 5B    504

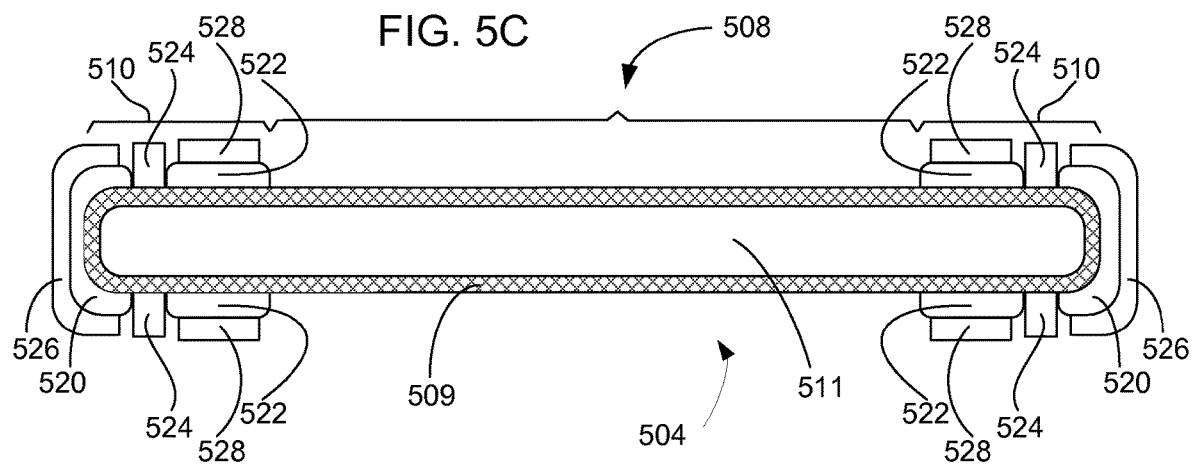
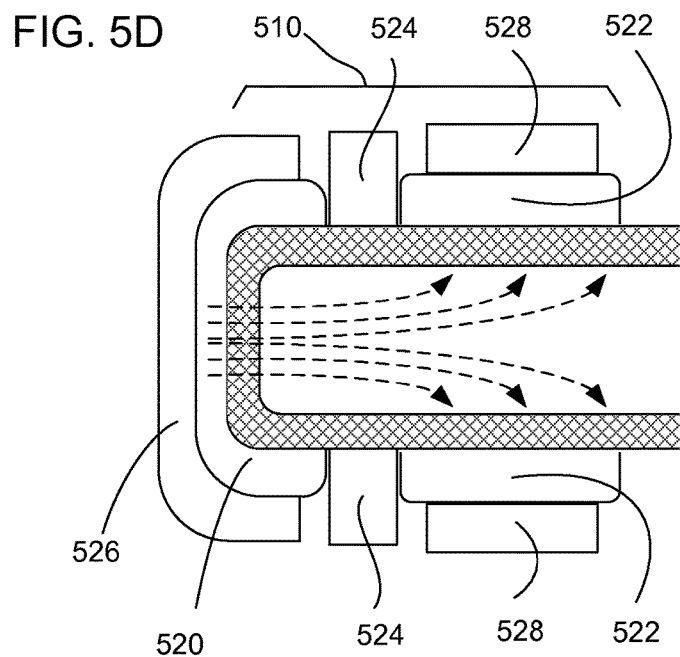

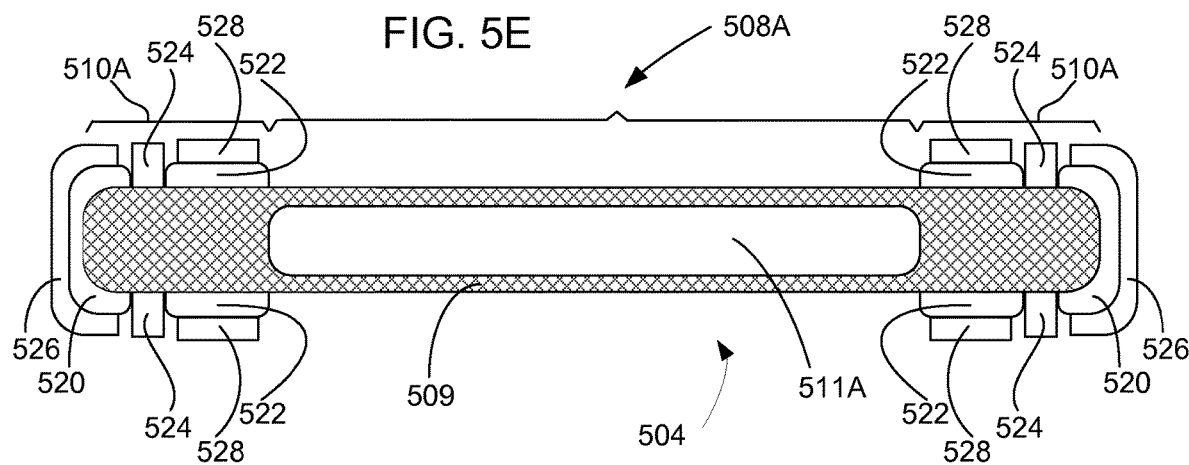
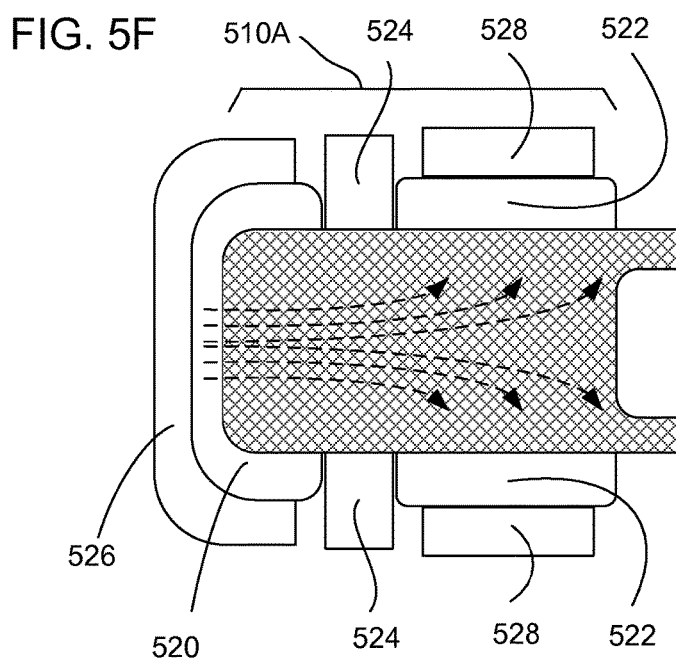
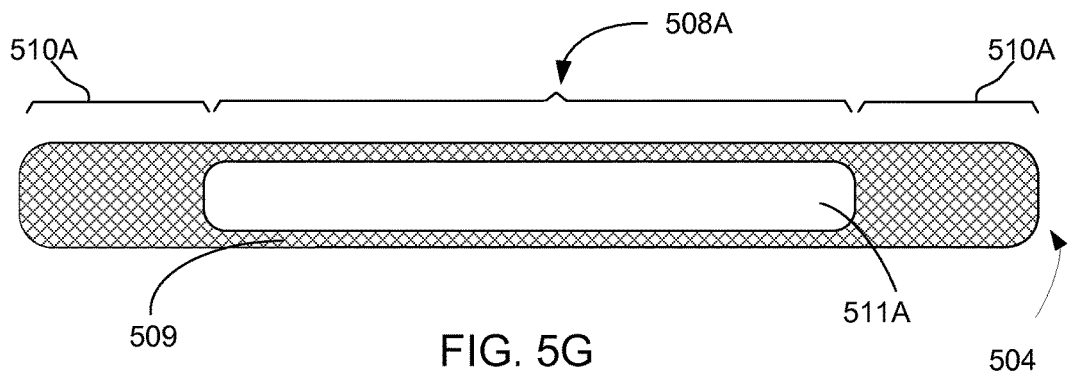

ELECTRONIC DEVICE HAVING SELECTIVELY STRENGTHENED GLASS

CROSS-REFERENCE TO RELATED APPLICATION(S)

This application is a continuation patent application of U.S. patent application Ser. No. 16/878,393, May 19, 2020 and titled "Electronic Device Having Selectively Strengthened Glass," which is a continuation patent application of U.S. patent application Ser. No. 15/660,839, filed Jul. 26, 2017 and titled "Electronic Device Having Selectively Strengthened Glass," now U.S. Pat. No. 10,676,393, which is a continuation patent application of U.S. patent application Ser. No. 13/235,090, filed Sep. 16, 2011 and titled "Electronic Device Having Selectively Strengthened Glass," now U.S. Pat. No. 9,725,359, which is a nonprovisional patent application of and claims the benefit of U.S. Provisional Patent Application No. 61/453,404, filed Mar. 16, 2011 and titled "Electronic Device Having Selectively Strengthened Glass," the disclosures of which are hereby incorporated herein by reference in their entireties.

BACKGROUND

Conventionally, small form factor devices, such as handheld electronic devices, have a display arrangement that includes various layers. The various layers include at least a display technology layer. Additionally, a sensing arrangement and/or a cover window may be disposed over the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer there between. The sensing arrangement may be a touch sensing arrangement such as those used to create a touch screen. For example, a capacitive sensing touch screen can include substantially transparent sensing points or nodes dispersed about a sheet of glass (or plastic). In addition, the cover window, which is typically designed as the outer protective barrier, may be glass or plastic. Glass tends to provide a better protective barrier given its strength and scratch resistance. There is, however, a continuing need for improved approaches for glass cover arrangements for electronic devices.

SUMMARY

Embodiments disclosed therein generally pertain to selectively strengthening glass. More particularly, techniques are described for selectively strengthening cover glass, which tends to be thin, for electronic devices, namely, portable electronic devices.

The invention can be implemented in numerous ways, including as a method, system, device or apparatus. Several embodiments of the invention are discussed below.

As a consumer electronic product, one embodiment can, for example, include at least a housing, electrical components disposed at least partially internal to the housing, and a cover glass coupled with the housing. The cover glass includes a selectively chemically strengthened surface region.

As a method for assembling an electronic product, one embodiment can, for example, include at least obtaining cover glass and selectively chemically strengthening one surface region of the cover glass differently than chemically strengthening an other surface region of the cover glass. Thereafter, the cover glass can be attached to a housing for the electronic product.

As a method for assembling an electronic product, one embodiment can, for example, include at least obtaining cover glass and shielding a portion of the cover glass. The shielding provides the cover glass with at least one shielded portion and at least one unshielded portion. The embodiment can also chemically strengthening the at least one unshielded portion of the cover glass. Thereafter, the cover glass can be attached to a housing for the electronic product.

As a method for assembling an electronic product, one embodiment can, for example, include at least obtaining cover glass and chemically strengthening the cover glass. Strengthening of a selected portion of the cover glass can be selectively enhanced. Thereafter, the cover glass can be attached to a housing for the electronic product.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 2 shows a detailed partial cross sectional view of selective strengthening of exposed surface portions of cover glass.

FIGS. 3A-3E are simplified cross sectional views showing selective strengthening of cover glass in one embodiment.

FIGS. 5A-5G are simplified cross sectional views showing selective strengthening of cover glass in yet another embodiment.

DETAILED DESCRIPTION

Embodiments disclosed therein generally pertain to selectively strengthening glass. More particularly, techniques are described for selectively strengthening cover glass, which tends to be thin, for electronic devices, namely, portable electronic devices.

Embodiments of the invention are discussed below with reference to FIGS. 1A-11. However, those skilled in the art will readily appreciate that the detailed description given herein with respect to these figures is for explanatory purposes as the invention extends beyond these limited embodiments.

Figure 1A:
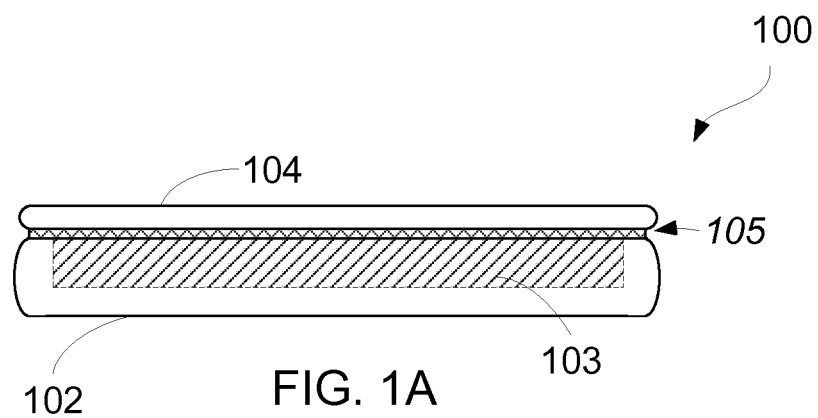
FIGS. 1A and 1B are various views of an electronic device in accordance with one embodiment.
Figure 1B:
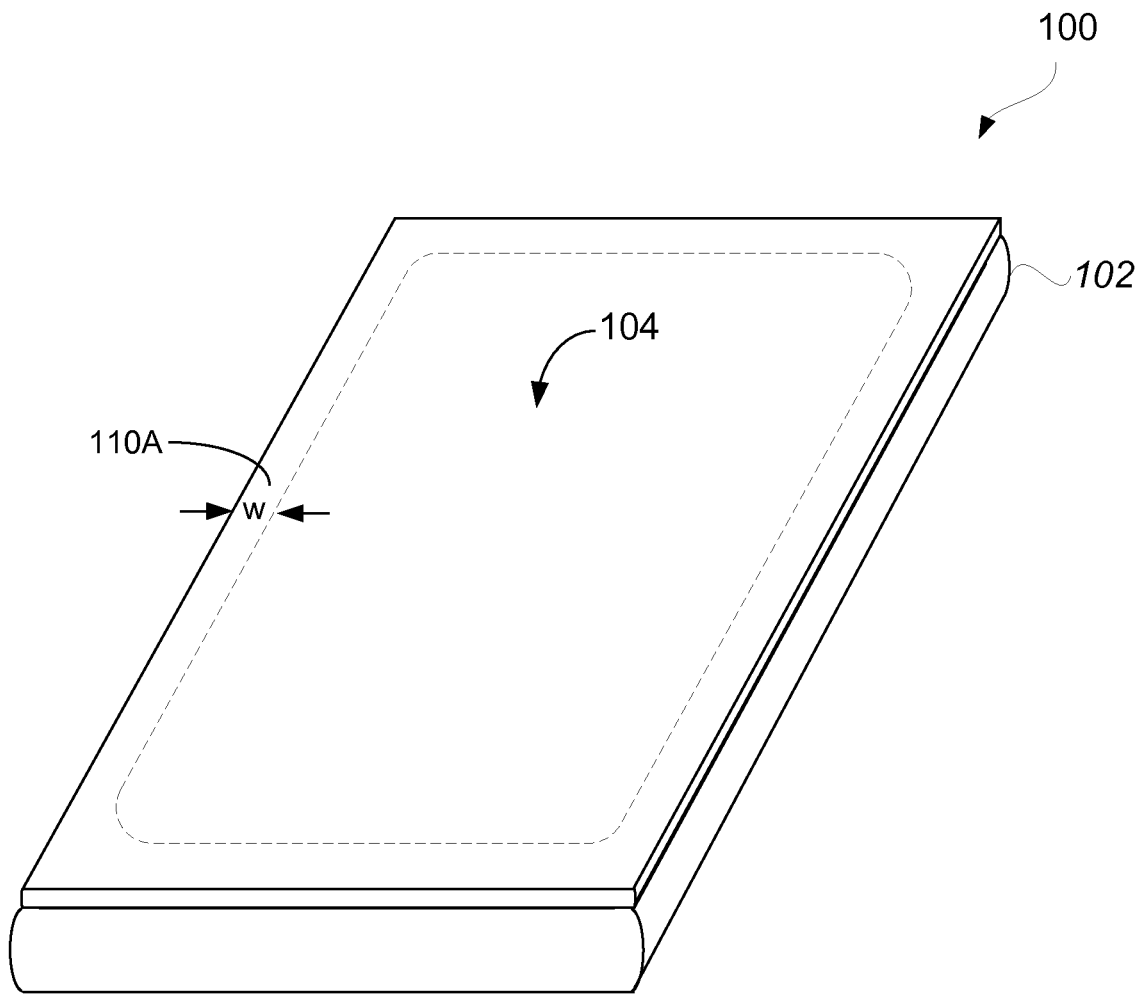

FIGS. 1A and 1B are various views of an electronic device 100 in accordance with one embodiment. The electronic device 100 may, for example, be embodied as portable or handheld electronic device having a thin form factor (or low profile). The electronic device 100 can, for example, correspond to a media player, a media storage device, a Portable Digital Assistant (PDA), a tablet PCs, a computer, a cellular phone, a smart phone, a GPS unit, a remote control, and the like.

As shown in cross sectional view in FIG. 1A, the electronic device 100 may include a housing 102 that serves as the outer surface for the electronic device 100. Electrical components 103 may be disposed within the housing 102. The electrical components may include, but are not limited to, a controller (or processor), memory, battery, display, camera, and illuminator such as a flash.

Additionally, the electronic device 100 may have a cover glass 104. The cover glass 104 may serve as an external surface, i.e., top surface, for the electronic device 100. The cover glass 104 may also resist scratching and therefore may provide a substantially scratch-resistance surface for the top surface of the housing 102 for the electronic device 100. The cover glass 104 may be coupled to the housing 102, for example, using an adhesive 105.

The electronic device 100 is shown in perspective view in FIG. 1B. Cover glass 104 may be provided over a display area. The cover glass 104 may be substantially transparent so that the display area can be viewed through the cover glass 104. The display area may be disposed within the housing 102 of the electronic device 100. The electronic device 100 may include a full view or substantially full view display area that consumes a majority of the front surface of the electronic device 100. The display area may be embodied in a variety of ways. In one example, the display area may comprise at least a display such as a flat panel display and more particularly an LCD display.

The display area may alternatively or additionally include a touch sensing device positioned over a display screen. For example, the display area may include one or more glass layers having capacitive sensing points distributed thereon. Each of these components may be separate layers or they may be integrated into one or more stacks. In one embodiment, the cover glass 104 may act as the outer most layer of the display area. The adhesive 105 can be translucent and extend around the periphery so as to not optically interfere with the display area.

The electronic device 100 may include a display region (e.g., the display area) that includes various layers. The various layers may include at least a display, and may additionally include a sensing arrangement disposed over the display. In some cases, the layers may be stacked and adjacent one another, and may even be laminated thereby forming a single unit. In other cases, at least some of the layers are spatially separated and not directly adjacent.

For example, the sensing arrangement may be disposed above the display such that there is a gap there between. By way of example, the display may include a Liquid Crystal Display (LCD) that includes a Liquid Crystal Module (LCM). The LCM generally includes at least an upper glass sheet and a lower glass sheet that at least partially sandwich a liquid crystal layer there between. The sensing arrangement may be a touch sensing arrangement such as those used to create a touch screen.

For example, a capacitive sensing touch screen may include substantially transparent sensing points or nodes dispersed about cover glass 104. The cover glass 104 may serve as the outer protective barrier for the display region. Typically, the cover glass 104 may be adjacent to the display region, but may also be integrated with the display region, such as another layer (outer protective layer).

As shown in FIG. 1B, the cover glass 104 may extend across the entire top surface of the housing 102. In such a case, the edges of the cover glass 104 may be aligned, or substantially aligned, with the sides of the housing 102. Given that the thickness of the cover glass 104 may be rather thin (i.e., less than a few millimeters), the glass material for the cover glass 104 can be selected from available glass that is stronger. For example, alumino silicate glass (e.g., DVTS from Corning) is one suitable choice for the glass material for the cover glass 104. Other examples of glass materials include, but are not limited to including, sodalime, borosilicate, and the like. Still another example of glass material may be lithium based glass. Additionally, the edges of the cover glass 104 can be configured to correspond to a particular predetermined geometry. By machining the edges of the cover glass 104 to correspond to the particular predetermined geometry, the cover glass pieces can become stronger. For additional information about use of predetermined geometries, see U.S. Provisional Patent Application No. 61/156,803, filed Mar. 2, 2009 and entitled "Techniques for Strengthening Glass Covers for Portable Electronic Devices", which hereby incorporated herein by reference in its entirety.

Moreover, as will be discussed in greater detail subsequently herein, the cover glass 104 can be selectively chemically treated for further strengthening. One suitable chemical treatment is to selectively expose one or more surface portions of the cover glass in a chemical bath containing potassium (e.g., KNO3) for a period of time (e.g., several hours) at an elevated temperature. Additionally, baths containing sodium may be used in conjunction with Lithium baths, as this combination may produce a compressive stress layer. In any case, the selective chemical treatment can desirably result in higher compression stresses at the selectively exposed surface portions of the cover glass pieces. The higher compression stresses may be the result ion exchange wherein $K^+$ ions effectively replacing some Na ions at or near the selectively exposed surface portions of the cover glass.

As particularly shown in FIG. 1B, a selectively chemically strengthened surface region 110A may comprise a selectively strengthened edge extremity 110A of the cover glass. The selectively chemically strengthened surface region 110A may have a width dimension, w, extending inwardly from peripheral edges of the cover glass. In other words, the selectively strengthened edge extremity 110A may have a width dimension, w. The width dimension may be about two to five millimeters, or more. For example the width dimension may be about ten millimeters. A notional dashed line in FIG. 1B representatively illustrates an inner extent of the selectively chemically strengthened surface region 110A.

The apparatus, systems and methods according to embodiments described herein are especially suitable for cover glasses or displays (e.g., LCD displays) assembled in small form factor electronic devices such as handheld electronic devices (e.g., mobile phones, media players, personal digital assistants, remote controls, etc.) The apparatus, systems and methods can also be used for cover glasses or displays for other relatively larger form factor electronic devices (e.g., portable computers, tablet computers, displays, monitors, televisions, etc.).

In one embodiment, the size of a glass cover depends on the size of the associated electronic device. For example, with handheld electronic devices, the glass cover is often not more than five (5) inches diagonal. As another example, for portable electronic devices, such as smaller portable computers or tablet computers, the glass cover is often between four (4) to twelve (12) inches diagonal. As still another example, for portable electronic devices, such as full size portable computers, displays or monitors, the glass cover is often between ten (10) to twenty (20) inches diagonal or even larger. The glass cover is typically rather thin, such as having a thickness less than about 5 mm, or more specifically less than about 3 mm, or more specifically less than about 1 mm.

FIG. 2 shows a detailed partial cross sectional view of selective strengthening of exposed surface portions of cover glass 204. FIG. 2 diagrammatically illustrates a chemical treatment process of submerging the cover glass 204 in a heated potassium bath 203 (for example a molten KNO3 bath), for selective chemically strengthening the cover glass 204. For example, the potassium bath may be heated to between about three-hundred and eighty degrees Celsius, and about four-hundred and fifty degrees Celsius. When the cover glass 204 is submerged or soaked in the heated potassium bath 203, diffusion and ion exchange can occur at exposed surface portions of the cover glass 204. Ion exchange may be inhibited in masked areas where corresponding surface portions of the cover glass are not exposed to the chemical bath.

As shown in FIG. 2, Na ions 205 which are present in cover glass 204 can diffuse into potassium bath 203, while $K^+$ ions 207 in potassium bath 203 can diffuse into cover glass 204 such that a compressive surface layer 209 can be formed. In other words, $K^+$ ions 207 from potassium bath 203 can be exchanged with Na ions 205 to form compressive surface layer 209. The $K^+$ ions 207 can provide a compressive stress surface stress (CS) of the compressive surface layer 209, which chemically strengthens the compressive surface layer 209 of the cover glass 204.

Cover glass 204 is shown in FIG. 2 as having a thickness (t). By controlling chemical treatment parameters such as the length of time of chemical strengthening treatment and/or the concentration of $K^+$ ions 207 in potassium bath 203, a depth (d) of compressive surface layer 209 and compressive stress surface stress (CS) of the compressive surface layer 209 may be substantially controlled. Depth of ion exchange (d) may be controlled in various ways for various cover glass thicknesses, for example by using high ion concentrations and/or bath temperatures and/or extended bath soak times, and/or by using applied electric fields to enhance diffusion. For example, bath soak time by be about six hours. In FIG. 2, the compressive surface layer 209 undergoing ion exchange is shown using cross hatching.

In some cases, $K^+$ ions 207 may not diffuse into a center portion 211 of cover glass 204. In FIG. 2 the center portion 211 is shown without cross hatching. The central portion 211 of the cover glass 204 can have a central tension (CT) in response to the compressive stress surface stress (CS) of the compressive surface layer 209.

As mentioned previously herein, ion exchange may be inhibited in masked areas where corresponding surface portions of the cover glass are not exposed to the chemical bath. Foil can, for example, be used for masking. Further, photolithographic patterning of ion exchange (selective chemical strengthening) of the cover glass may be done by photolithographically patterning masks thereon. In such case, photosensitive polyimide may be used for masking; or an applied over layer of aluminum (which may be applied by sputtering) may be photolithographically patterned into a patterned mask using photoresist and etching of the aluminum.

Figure 3C:
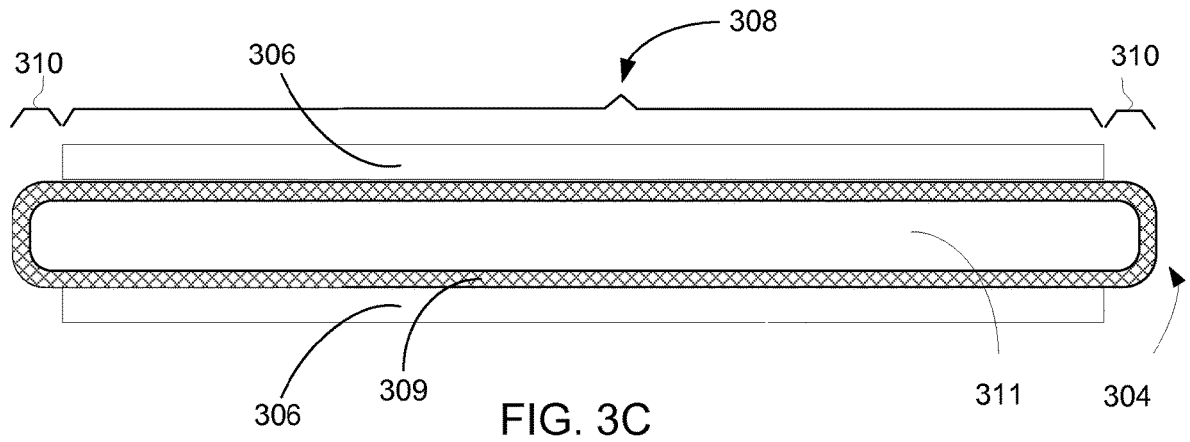

FIGS. 3A-3E are simplified cross sectional views showing selective strengthening of cover glass in one embodiment. FIG. 3A shows cover glass 304 prior to a first strengthening treatment. FIG. 3B shows a cover glass 304 after the first strengthening treatment, such as treatment in a first heated potassium bath for a first period of time as discussed previously herein.

In FIGS. 3B-3E compressive surface layer 309 from undergoing ion exchange is shown using cross hatching. Compressive surface layer 309 can have a corresponding depth of compressive layer. In some cases, potassium ions may not diffuse into a center portion 311 of cover glass 304. In FIG. 3B the center portion 311 is shown without cross hatching. The central portion 311 of the cover glass 304 can have a central tension (CT) in response to the compressive stress surface stress (CS) of the compressive surface layer 309. For example, hypothetically speaking, the following is theorized with respect to possible effects of the first strengthening treatment: the compressive surface layer 309 may have a peak compressive stress of about seven hundred and thirty Mega Pascals (730 Mega Pascals), and a depth of compressive layer of about thirty eight point six microns (38.6 microns); and the central portion 311 may have a central tension of about fifty-four Mega Pascals (54 Mega Pascals.)

FIG. 3C shows shielding 306 of a portion of the cover glass 304, the shielding 306 providing the cover glass 304 with at least one shielded portion 308 and at least one unshielded portion 310. Suitable masking 306 of the cover glass, as discussed previously herein, may be used for the shielding 306 of the cover glass 304. For example, as shown in FIG. 3C opposing major surfaces of the cover glass may be shielded by applied mask material 306, so as to provide the shielded portion 308 of the cover glass. Edge extremities 310 of the cover glass 304 may be unshielded portions 310. Mask 306 may be suitably patterned as desired for shielded portion 308 and unshielded portion 310. For example, unshielded portion 310 may have a width dimension of about two to about five millimeters, or more. For example the width dimension may be about ten millimeters.

Figure 3D:
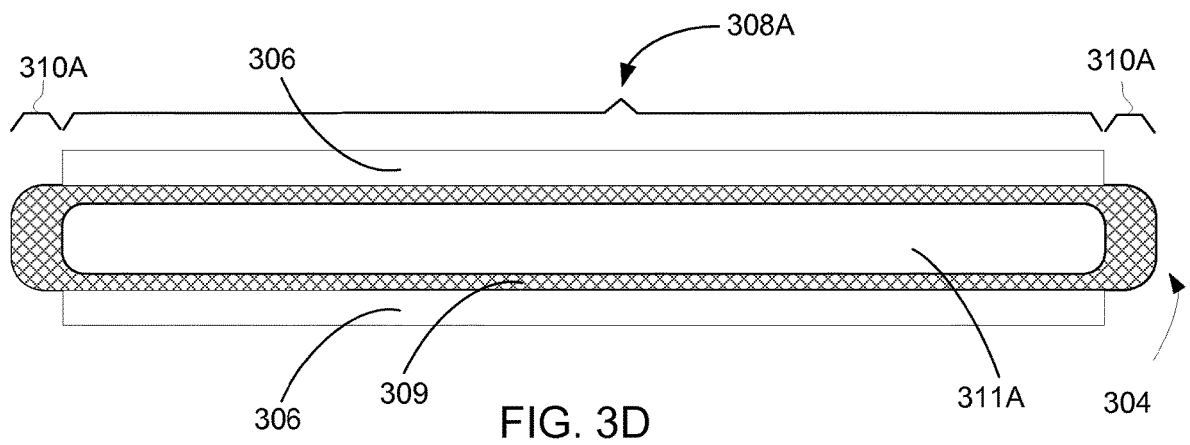

FIG. 3D shows cover glass 304 after a second strengthening treatment, such as treatment in a second heated potassium bath for a second period of time as discussed previously herein. Strengthening of a selected unshielded portion 310 of the cover glass can be selectively enhanced by the second strengthening treatment. Because it is unshielded, unshielded portion 310 may be substantially affected by the second strengthening treatment, so as to provide a selectively chemically strengthened surface region 310A. Conversely, because it is shielded, shielded portion 308 of the other chemically strengthened surface region 308A may be substantially unaffected by the second strengthening treatment. Accordingly, the selectively chemically strengthened surface region 310A of the cover glass may have enhanced strengthening that is greater than strengthening of the other chemically strengthened surface region 308A. In light of the foregoing, it should be understood that the selectively chemically strengthened surface region 310A of the cover glass may be strengthened differently than the other chemically strengthened surface region 308A. After the second strengthening treatment, the shielding 306 may be removed as shown in FIG. 3E.

Figure 3E:
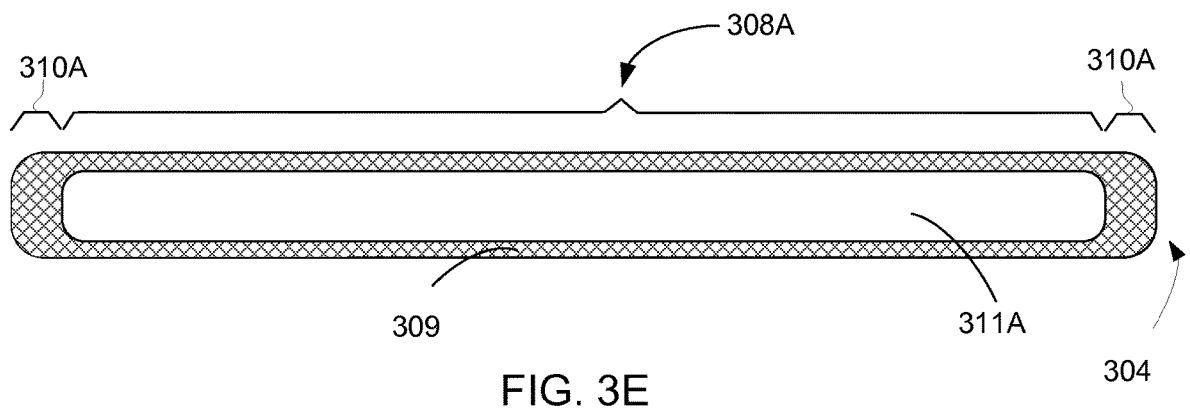

In FIGS. 3D and 3E, the selectively chemically strengthened surface region 310A of the cover glass may have enhanced strengthening with an enhanced depth of compressive layer that is deeper than the depth of compressive layer of the other chemically strengthened surface region 308A. For example, hypothetically speaking, it is theorized that the enhanced depth of compressive layer of the selectively chemically strengthened surface region 310A may be about one hundred microns, while the depth of compressive layer of the other chemically strengthened surface region 308A may be about thirty eight point six microns.

Comparing FIG. 3C to FIG. 3D for illustration of the effects of the second strengthening treatment, the enhanced, deeper depth of compressive layer of the selectively chemically strengthened surface region 310A is highlighted with expanded cross hatching in the selectively chemically strengthened surface region 310A. Similarly, a modified central region 311A in FIG. 3D is depicted as smaller, relative to corresponding central region 311 in FIG. 3C. Of course, it should be understood that since depth of compressive layer differences may be on the order of tens of microns, differences between FIGS. 3C and 3D may be shown as greatly exaggerated for ease of illustration.

Furthermore, it should be understood that the selectively chemically strengthened surface region 310A of the cover glass may have enhanced strengthening, with an enhanced compressive stress that is greater than compressive stress of the other chemically strengthened surface region 308A. For example, hypothetically speaking, it is theorized that the two regions 310A, 308A may have similar peak compressive stress of about seven hundred and thirty Mega Pascals. However, because of the aforementioned deeper depth of compressive layer, the selectively chemically strengthened surface region 310A of the cover glass may have total accumulated compressive stress that is greater than corresponding total accumulated compressive stress of the other chemically strengthened surface region 308A.

Moreover, the selectively chemically strengthened surface region 310A of the cover glass may have enhanced strengthening, with an enhanced central tension that is greater than central tension of the other chemically strengthened surface region 308A. For example, hypothetically speaking, it is theorized that the enhanced central tension of the selectively chemically strengthened surface region 310A may be about ninety-one Mega Pascals, while the central tension of the other chemically strengthened surface region 308A may be about fifty-one Mega Pascals.

Figure 4A:
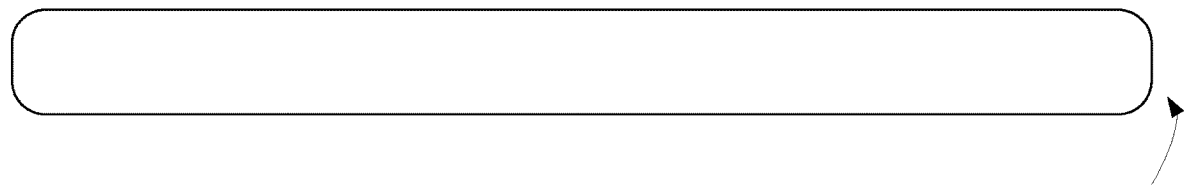
FIGS. 4A-4E are simplified cross sectional views showing selective strengthening of cover glass in another embodiment.
Figure 4B:
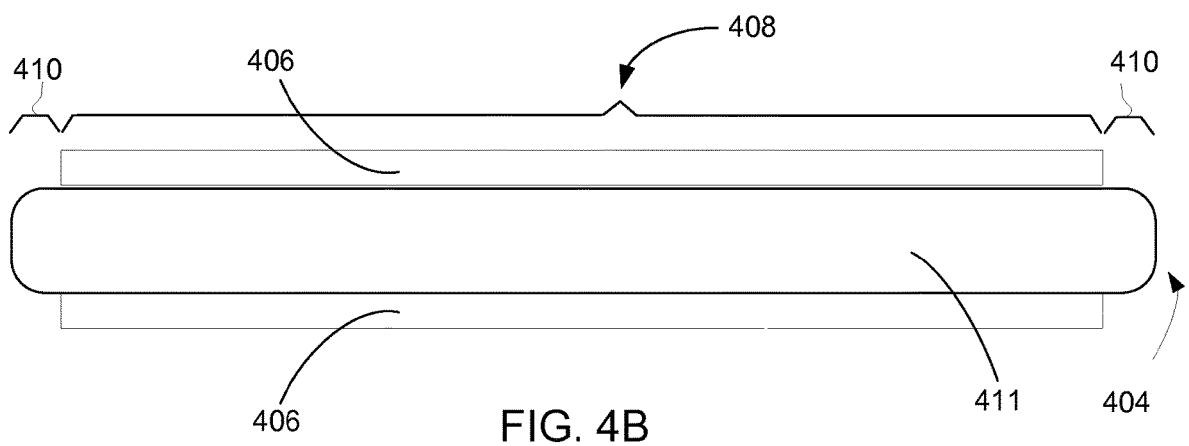

FIGS. 4A-4E are simplified cross sectional views showing selective strengthening of cover glass in another embodiment. FIG. 4A shows cover glass 404 prior to a first strengthening treatment. Prior to the first strengthening treatment, FIG. 4B shows shielding 406 of a portion of the cover glass 404, the shielding 406 providing the cover glass 404 with at least one shielded portion 408 and at least one unshielded portion 410. Suitable masking 406 of the cover glass, as discussed previously herein, may be used for the shielding 406 of the cover glass 404. For example, as shown in FIG. 4B opposing major surfaces of the cover glass may be shielded by applied mask material 406, so as to provide the shielded portion 408 of the cover glass. Edge extremities 410 of the cover glass 404 may be unshielded portions 410. Mask 406 may be suitably patterned as desired for shielded portion 408 and unshielded portion 410.

Figure 4C:
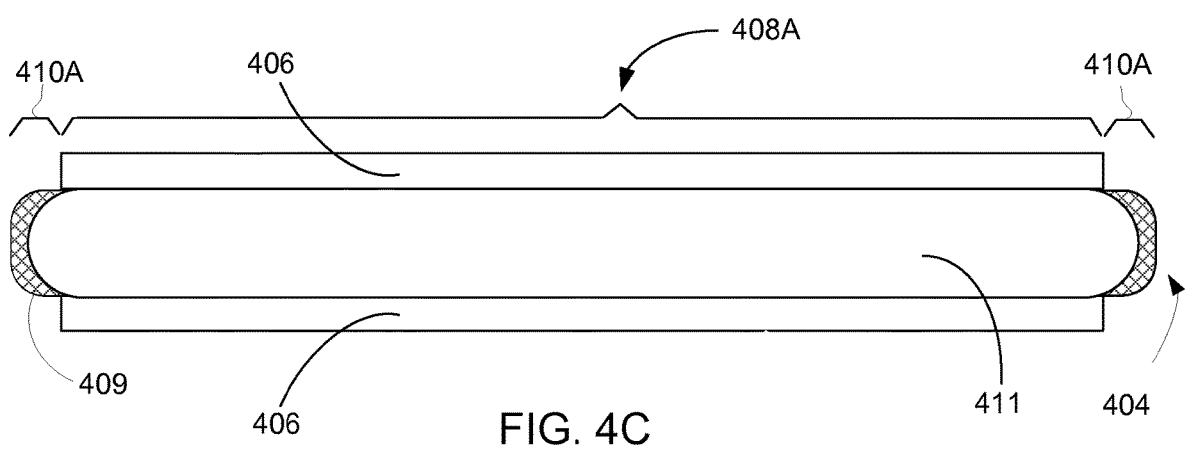

FIG. 4C shows a cover glass 404 after the first strengthening treatment, such as treatment in a first heated potassium bath for a first period of time as discussed previously herein. Compressive surface layer 409 from undergoing ion exchange in unshielded portion 410A is shown using cross hatching. In some cases, potassium ions may not diffuse into a center portion 411 of cover glass 404. In FIG. 4C the center portion 411 is shown without cross hatching.

Because it is unshielded, unshielded portion 410A may be substantially affected by the first strengthening treatment. Conversely, because it is shielded, shielded portion 408A may be substantially unaffected by the first strengthening treatment. After the first strengthening treatment, the shielding 406 may be removed as shown in FIG. 4D.

Figure 4D:
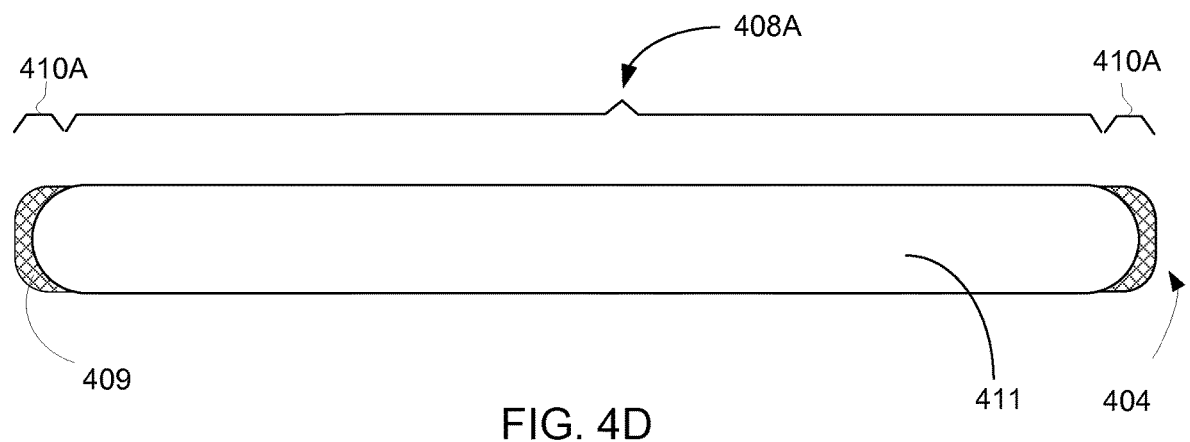
Figure 4E:
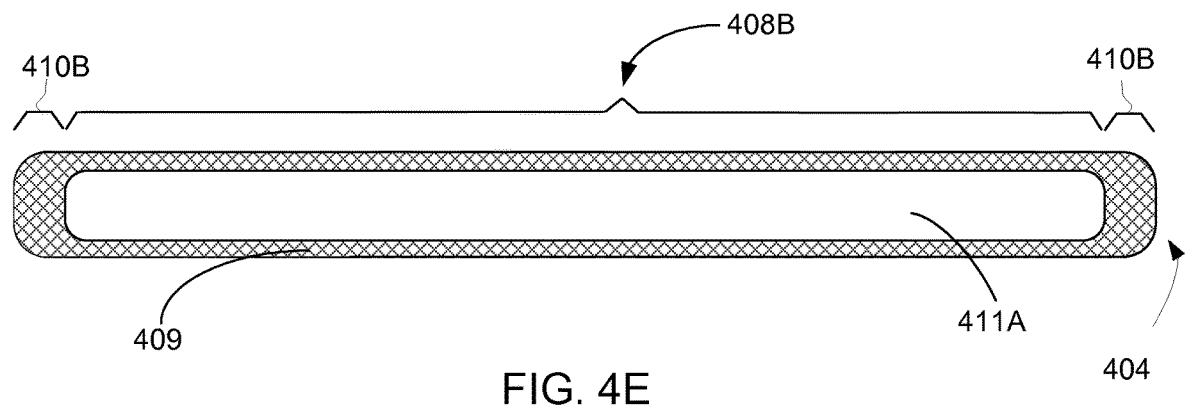

FIG. 4E shows cover glass 404 after a second strengthening treatment, such as treatment in a second heated potassium bath for a second period of time as discussed previously herein. Because it has already undergone the first strengthening treatment, selectively chemically strengthened surface region 410B may be substantially affected by the second strengthening treatment. In particular, strengthening of selectively chemically strengthened surface region 410B can be selectively enhanced by the second strengthening treatment. However, it should be understood that because it was previously shielded, the other chemically strengthened surface region 408B may not have been affected by the first chemical strengthening treatment, and may show relatively less effect after the second strengthening treatment. Accordingly, the selectively chemically strengthened surface region 410B of the cover glass may have enhanced strengthening that is greater than strengthening of the other chemically strengthened surface region 408B. In light of the foregoing, it should be understood that the selectively chemically strengthened surface region 410B of the cover glass may be strengthened differently than the other chemically strengthened surface region 408B.

In FIGS. 4D and 4E, the selectively chemically strengthened surface region 410B of the cover glass may have enhanced strengthening with an enhanced depth of compressive layer that is deeper than the depth of compressive layer of the other chemically strengthened surface region 408B. Comparing FIG. 4D to FIG. 4E for illustration of the effects of the second strengthening treatment, the enhanced, deeper depth of compressive layer of the selectively chemically strengthened surface region 410B is highlighted with expanded cross hatching in the selectively chemically strengthened surface region 410B. Similarly, a modified central region 411A in FIG. 4E is depicted as smaller, relative to corresponding central region 411 in FIG. 4D.

Furthermore, it should be understood that the selectively chemically strengthened surface region 410B of the cover glass may have enhanced strengthening, with an enhanced compressive stress that is greater than compressive stress of the other chemically strengthened surface region 408B. Moreover, the selectively chemically strengthened surface region 410B of the cover glass may have enhanced strengthening, with an enhanced central tension that is greater than central tension of the other chemically strengthened surface region 408B.

FIGS. 5A-5G are simplified cross sectional views showing selective strengthening of cover glass in yet another embodiment. FIG. 5A shows cover glass 504 prior to a first strengthening treatment. FIG. 5B shows a cover glass 504 after the first strengthening treatment, such as treatment in a first heated potassium bath for a first period of time as discussed previously herein. Compressive surface layer 509 from undergoing ion exchange is shown using cross hatching. Compressive surface layer 509 can have a corresponding depth of compressive layer. In some cases, potassium ions may not diffuse into a center portion 511 of cover glass 504. In FIG. 5B the center portion 511 is shown without cross hatching.

FIG. 5C illustrates selective strengthening of selected surface portion 510 of the cover glass 504 using a second strengthening treatment of electric field assisted ion exchange strengthening in a heated environment, such as an electric furnace. Electrode placement may be chosen so that other surface portion 508 is substantially unaffected. An anode paste 520 and a cathode paste 522 may each have a suitable thickness, for example about one half to about one millimeter, wherein the pastes may comprise KNO3 and $Al_2O_3$ and a suitable binder, and may be applied in contact with the cover glass 504. The anode paste 520 and cathode paste 522 may be separate from each other by a suitable mask 524, for example a high temperature rubber, such as a fluorinated rubber.

A suitable voltage may be approximately within a range from about one hundred volts to about three hundred volts, which may be applied to an anode electrode 526 (coupled to the anode paste 520) and to a cathode electrode 528 (coupled to the cathode paste 522) for a sufficient period of time, for example, approximately six hours. The anode electrode 526 and the cathode electrode 528 may employ a suitable metal. A noble metal such as platinum may be employed, or a temperature-resistant material such as tungsten or molybdenum.

FIG. 5D shows a detailed view of FIG. 5C, to illustrate selective strengthening of selected surface portion 510 of the cover glass 504 using the electric field assisted ion exchange strengthening. Notional dashed arrows are shown in FIG. 5D to illustrate electric field assisted $K^+$ ion diffusion into the selected surface portion.

FIG. 5E shows cover glass 504 after the second strengthening treatment of electric field assisted ion exchange strengthening. FIG. 5F shows a detailed view of FIG. 5E. FIG. 5G shows electrodes removed after the second strengthening treatment. Strengthening of selected surface region 510A of the cover glass can be selectively enhanced by the second strengthening treatment. Selectively chemically strengthened surface region 510A may be substantially affected by undergoing both the first and second strengthening treatment. However, the other chemically strengthened surface region 508A may be substantially unaffected by the second strengthening treatment. Accordingly, the selectively chemically strengthened surface region 510A of the cover glass may have enhanced strengthening that is greater than strengthening of the other chemically strengthened surface region 508A. In light of the foregoing, it should be understood that the selectively chemically strengthened surface region 510A of the cover glass may be strengthened differently than the other chemically strengthened surface region 508A.

The selectively chemically strengthened surface region 510A of the cover glass may have enhanced strengthening with an enhanced depth of compressive layer that is deeper than the depth of compressive layer of the other chemically strengthened surface region 508A. Comparing FIG. 5C to FIG. 5E (and comparing detailed view 5D to detailed view 5F) for illustration of the effects of the second strengthening treatment, the enhanced, deeper depth of compressive layer of the selectively chemically strengthened surface region 510A is highlighted with expanded cross hatching in the selectively chemically strengthened surface region 510A. Similarly, a modified central region 511A in FIG. 5E is depicted as smaller, relative to corresponding central region 511 in FIG. 5C.

Furthermore, it should be understood that the selectively chemically strengthened surface region 510A of the cover glass may have enhanced strengthening, with an enhanced compressive stress that is greater than compressive stress of the other chemically strengthened surface region 508A. Moreover, the selectively chemically strengthened surface region 510A of the cover glass may have enhanced strengthening, with an enhanced central tension that is greater than central tension of the other chemically strengthened surface region 508A.

Figure 6A:
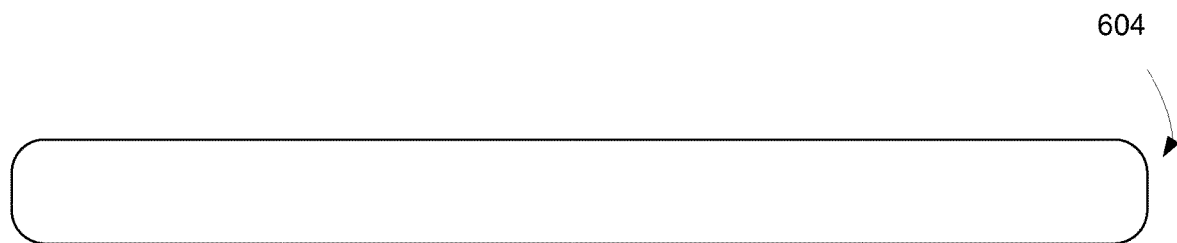
FIGS. 6A-6E are simplified cross sectional views showing selective strengthening of cover glass in still yet another embodiment.
Figure 6B:
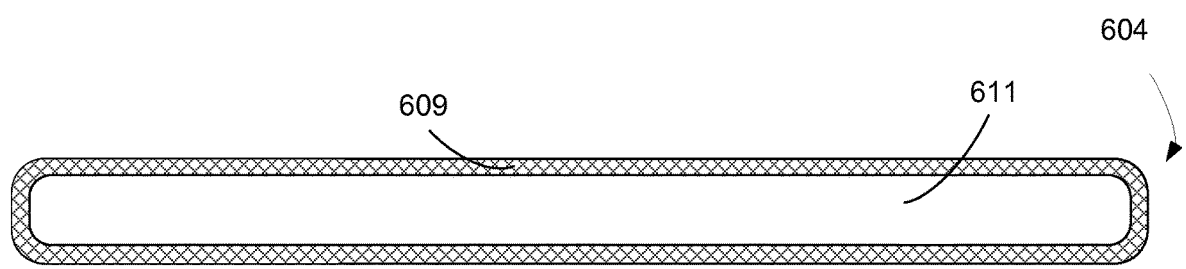

FIGS. 6A-6E are simplified cross sectional views showing selective strengthening of cover glass in still yet another embodiment. FIG. 6A shows cover glass 604 prior to a first strengthening treatment. FIG. 6B shows a cover glass 604 after the first strengthening treatment, such as treatment in a first heated potassium bath for a first period of time as discussed previously herein.

Compressive surface layer 609 from undergoing ion exchange is shown using cross hatching. Compressive surface layer 609 can have a corresponding depth of compressive layer. In some cases, potassium ions may not diffuse into a center portion 611 of cover glass 604. In FIG. 6B the center portion 611 is shown without cross hatching.

Figure 6C:
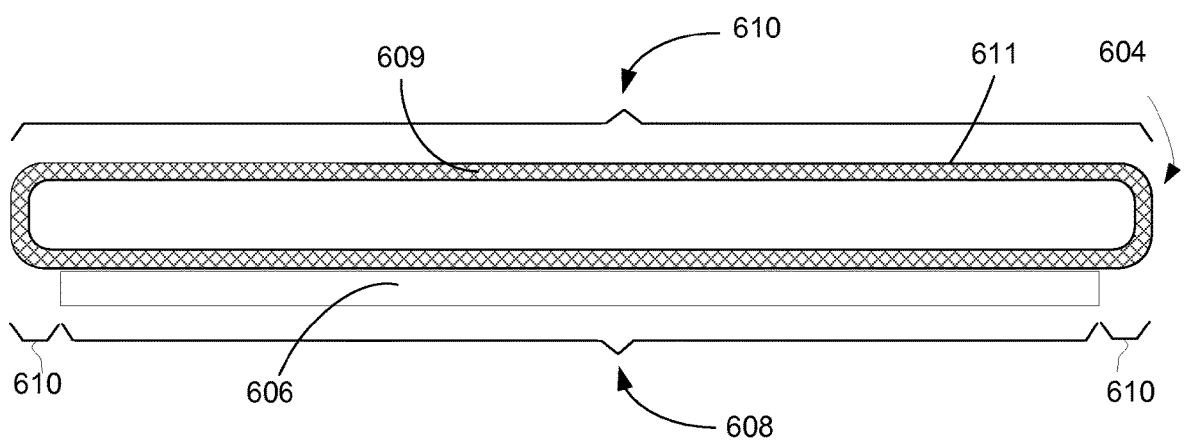

FIG. 6C shows shielding 606 of a portion of the cover glass 604, the shielding 606 providing the cover glass 604 with at least one shielded portion 608 and at least one unshielded portion 610. Suitable masking 606 of the cover glass, as discussed previously herein, may be used for the shielding 606 of the cover glass 604. For example, as shown in FIG. 6C a bottom major surface of the cover glass may be shielded by applied mask material 606, so as to provide the shielded portion 608 of the cover glass. Edge extremities and a top major surface 610 of the cover glass 604 may be unshielded portions 610. Mask 606 may be suitably patterned as desired for shielded portion 608 and unshielded portion 610.

Figure 6D:
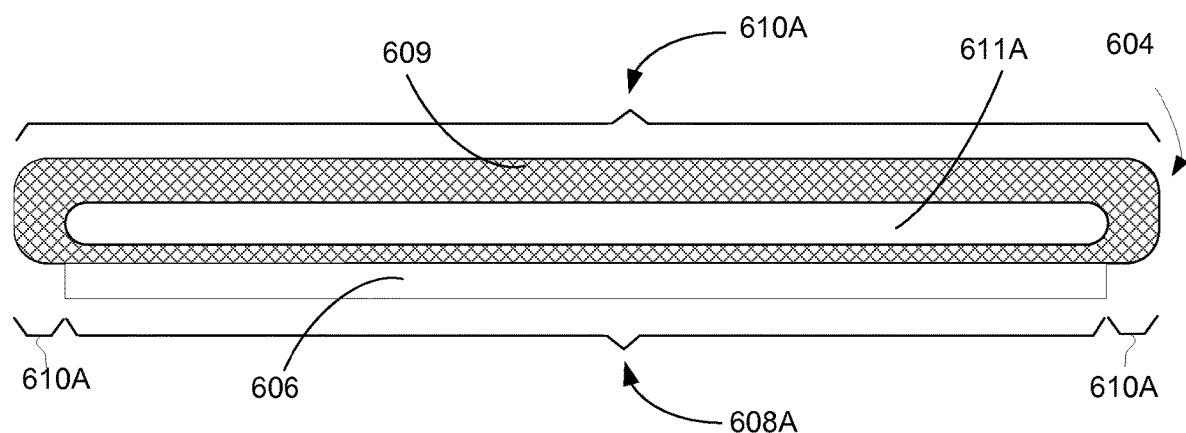

FIG. 6D shows cover glass 604 after a second strengthening treatment, such as treatment in a second heated potassium bath for a second period of time as discussed previously herein. Strengthening of a selected unshielded portion 610A of the cover glass can be selectively enhanced by the second strengthening treatment. Because it is unshielded, unshielded portion 610A may be substantially affected by the second strengthening treatment, so as to provide a selectively chemically strengthened surface region 610A. Conversely, because it is shielded, shielded portion 608A of the other chemically strengthened surface region 608A may be substantially unaffected by the second strengthening treatment. Accordingly, the selectively chemically strengthened surface region 610A of the cover glass may have enhanced strengthening that is greater than strengthening of the other chemically strengthened surface region 608A. In light of the foregoing, it should be understood that the selectively chemically strengthened surface region 610A of the cover glass may be strengthened differently than the other chemically strengthened surface region 608A. After the second strengthening treatment, the shielding 606 may be removed as shown in FIG. 6E.

Figure 6E:
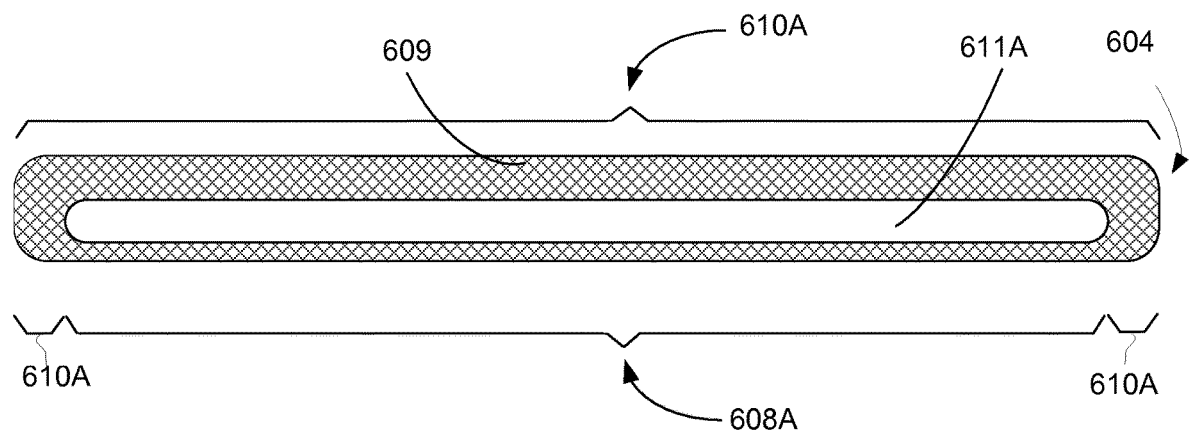

In FIGS. 6D and 6E, the selectively chemically strengthened surface region 610A of the cover glass may have enhanced strengthening with an enhanced depth of compressive layer that is deeper than the depth of compressive layer of the other chemically strengthened surface region 608A. Comparing FIG. 6C to FIG. 6D for illustration of the effects of the second strengthening treatment, the enhanced, deeper depth of compressive layer of the selectively chemically strengthened surface region 610A is highlighted with expanded cross hatching in the selectively chemically strengthened surface region 610A. Similarly, a modified central region 611A in FIG. 6D is depicted as smaller, relative to corresponding central region 611 in FIG. 6C.

Furthermore, it should be understood that the selectively chemically strengthened surface region 610A of the cover glass may have enhanced strengthening, with an enhanced compressive stress that is greater than compressive stress of the other chemically strengthened surface region 608A. Moreover, the selectively chemically strengthened surface region 610A of the cover glass may have enhanced strengthening, with an enhanced central tension that is greater than central tension of the other chemically strengthened surface region 608A.

Figure 7:
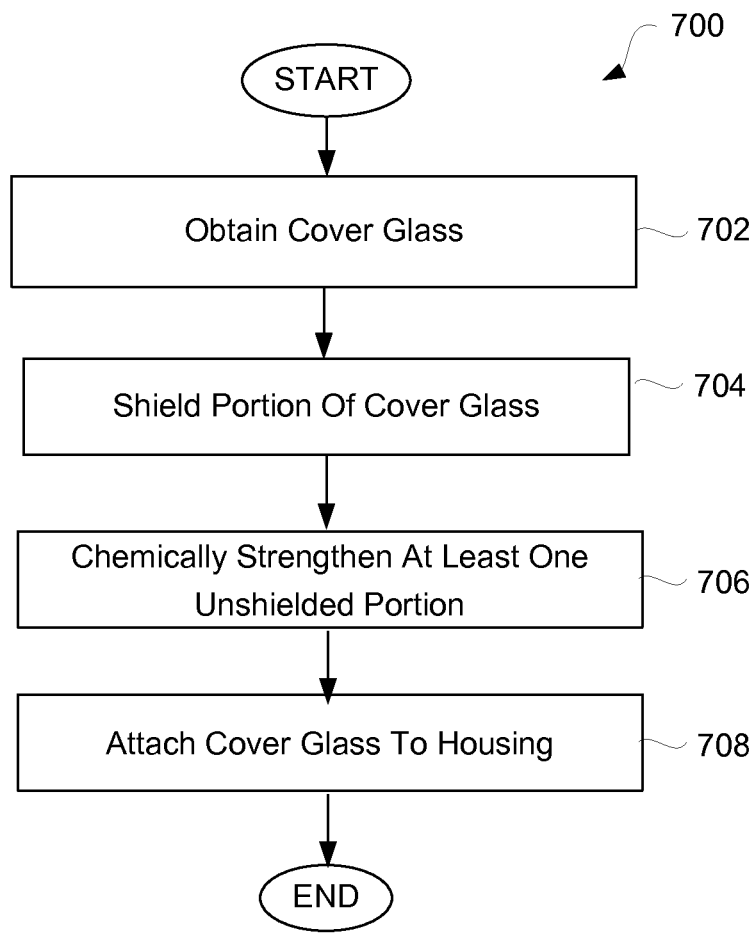
FIG. 7 is a flow diagram showing one embodiment of an assembly process.

FIG. 7 is a flow diagram illustrating an assembly process 700 of one embodiment. The assembly process 700 may begin with obtaining 702 a cover glass. The assembly process 700 may continue with shielding 704 a portion of the cover glass. The shielding may provide the cover glass with at least one shielded portion and at least one unshielded portion. In one embodiment, such shielding 704 may involve patterning (or, more particularly, photolithographic patterning) on the cover glass.

The assembly process 700 may continue with chemically strengthening 706 the at least one unshielded portion of the cover glass. The at least one unshielded portion of the cover glass may be exposed to ion exchange. The assembly process 700 may continue with subsequently attaching 708 the cover glass to the housing. Once the cover glass has been attached to the housing, the assembly process 700 can end.

Figure 8:
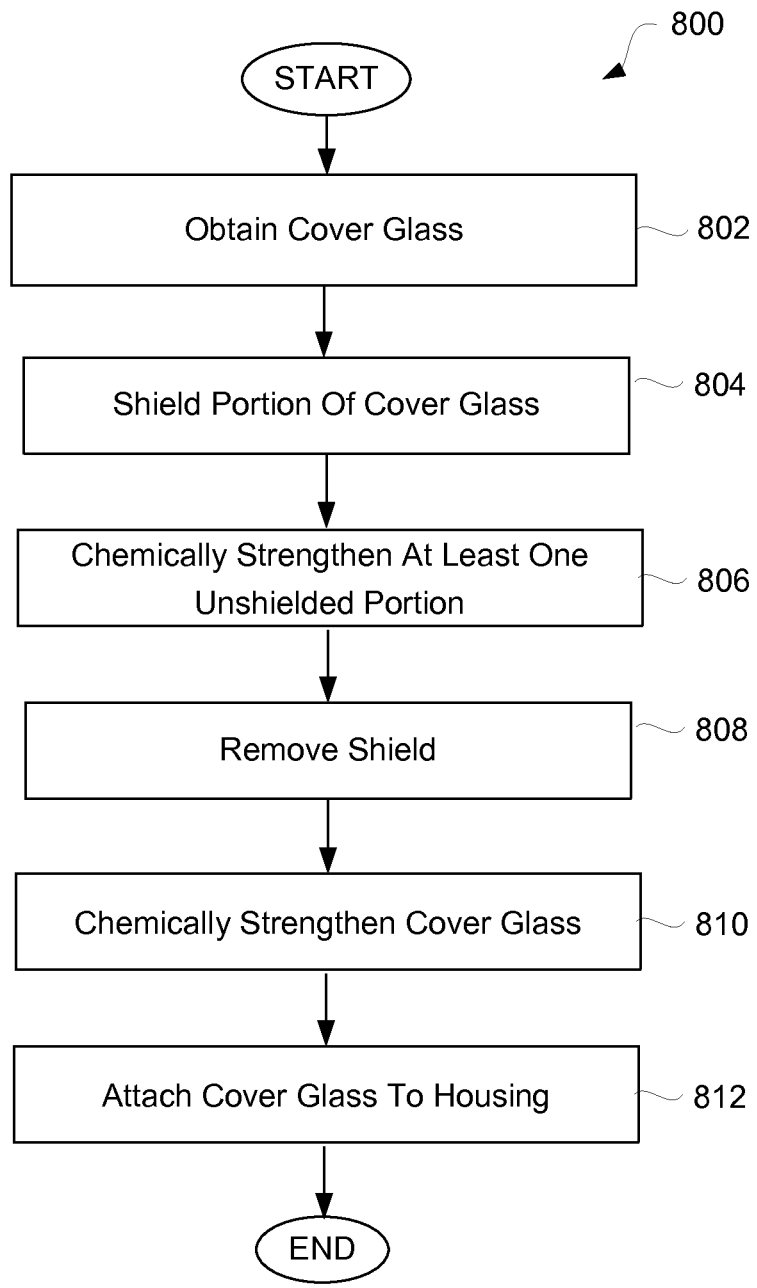
FIG. 8 is a flow diagram showing another embodiment of an assembly process.

FIG. 8 is a flow diagram showing another embodiment of an assembly process 800. The assembly process 800 may begin with obtaining 802 a cover glass. The assembly process 800 may continue with shielding 804 a portion of the cover glass. The shielding may provide the cover glass with at least one shielded portion and at least one unshielded portion. In one embodiment, such shielding 804 may involve patterning (or, more particularly, photolithographic patterning) on the cover glass.

The assembly process 800 may continue with chemically strengthening 806 the at least one unshielded portion of the cover glass. The at least one unshielded portion of the cover glass may be exposed to ion exchange. The assembly process 800 may continue with removing 808 the shielding. The assembly process 800 may continue with a second chemical strengthening 810 of the cover glass. The assembly process 800 may continue with subsequently attaching 812 the cover glass to the housing. Once the cover glass has been attached to the housing, the assembly process 800 can end.

Figure 9:
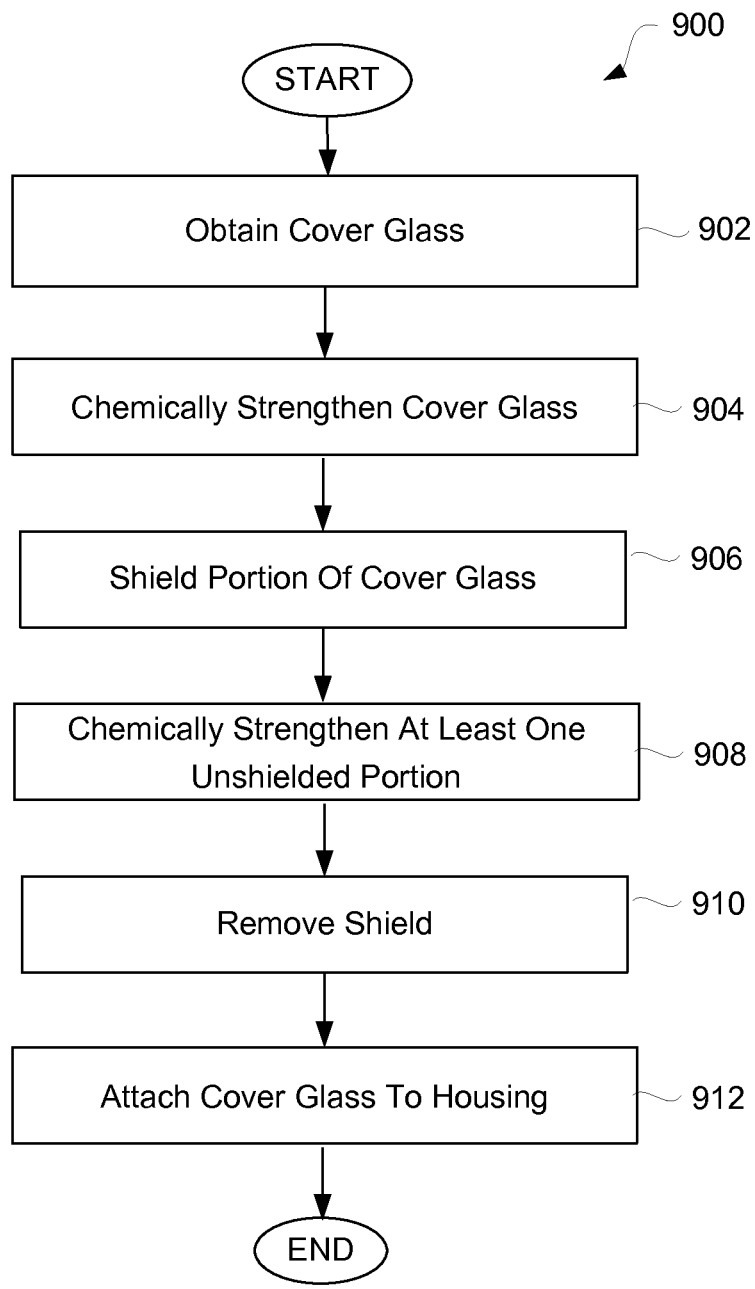
FIG. 9 is a flow diagram showing yet another embodiment of an assembly process.

FIG. 9 is a flow diagram showing yet another embodiment of an assembly process 900. The assembly process 900 may begin with obtaining 902 a cover glass. The process 900 may begin with a first chemical strengthening 904 of the cover glass. The assembly process 900 may continue with shielding 906 a portion of the cover glass. The shielding may provide the cover glass with at least one shielded portion and at least one unshielded portion. In one embodiment, such shielding 906 may involve patterning (or, more particularly, photolithographic patterning) on the cover glass.

The assembly process 900 may continue with second chemical strengthening. In particular, the assembly process 900 may continue with chemically strengthening 908 the at least one unshielded portion of the cover glass. The at least one unshielded portion of the cover glass may be exposed to ion exchange. The assembly process 900 may continue with removing 910 the shielding. The assembly process 900 may continue with subsequently attaching 912 the cover glass to the housing. Once the cover glass has been attached to the housing, the assembly process 900 can end.

Figure 10:
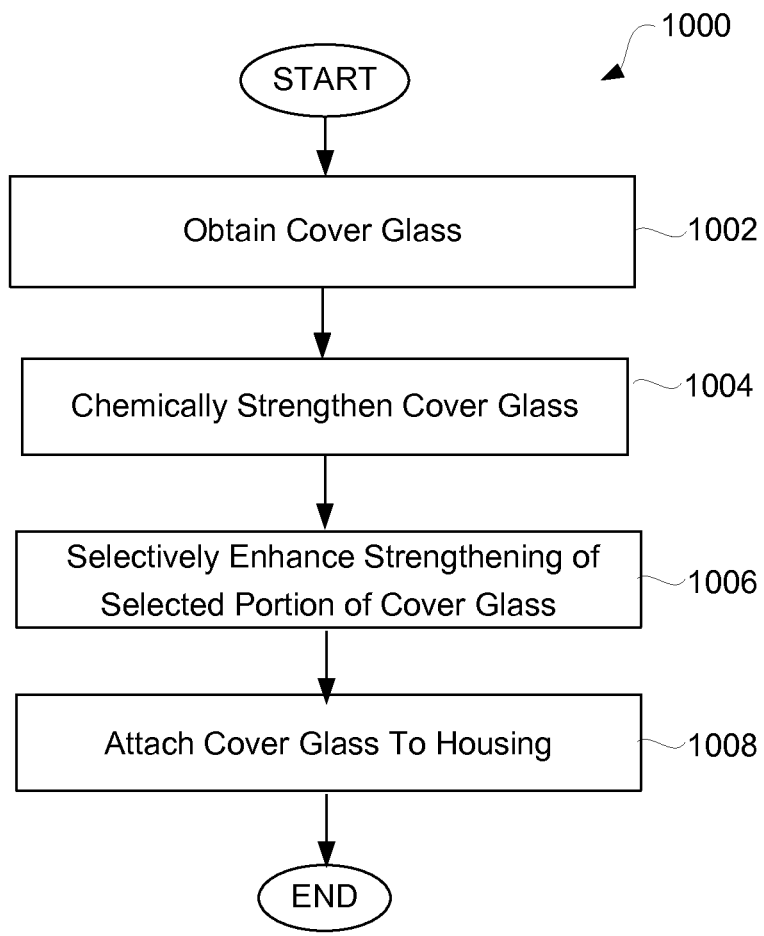
FIG. 10 is a flow diagram showing still another embodiment of an assembly process.

FIG. 10 is a flow diagram showing still another embodiment of an assembly process 1000. The assembly process 1000 may begin with obtaining 1002 a cover glass. The assembly process 1000 may continue with chemically strengthening 1004 the cover glass. The assembly process 1000 may continue with selectively enhancing 1006 strengthening of a selected portion of the cover glass. The assembly process 1000 may continue with subsequently attaching 1008 the cover glass to the housing. Once the cover glass has been attached to the housing, the assembly process 1000 can end.

Figure 11:
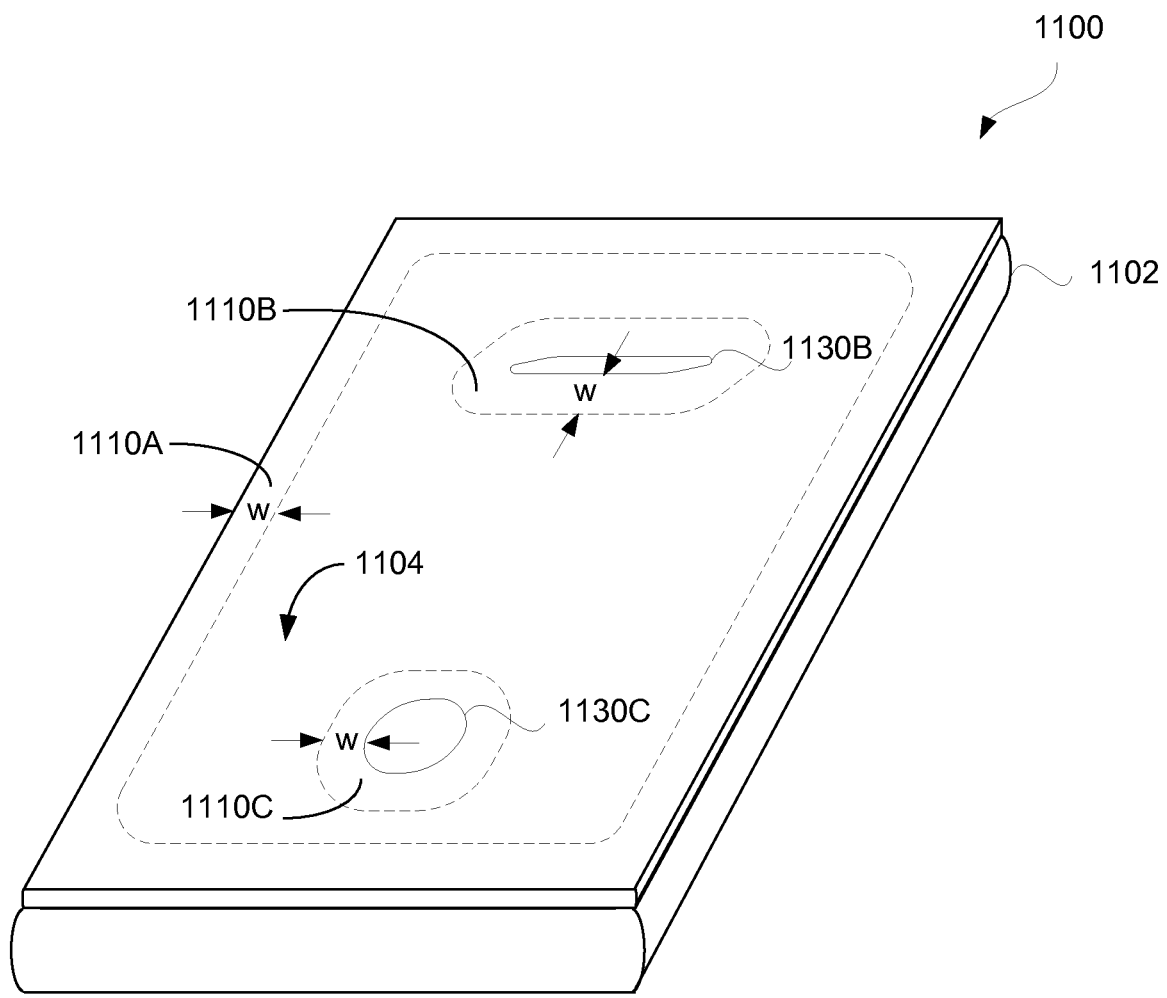
FIG. 11 is a perspective view of an electronic device in accordance with another embodiment.

FIG. 11 is a perspective view of an electronic device in accordance with another embodiment. As particularly shown in FIG. 11, a selectively chemically strengthened surface region 1110A may comprise a selectively strengthened edge extremity 1110A of the cover glass. The selectively chemically strengthened surface region 1110A may have a width dimension, w, extending inwardly from peripheral edges of the cover glass. In other words, the selectively strengthened edge extremity 1110A may have a width dimension, w. The width dimension may be about two to five millimeters, or more. For example the width dimension may be about ten millimeters. A notional dashed line in FIG. 11 representatively illustrates an inner extent of the selectively chemically strengthened surface region 1110A.

Similarly the cover glass may have one or more apertures 1130B, 1130C extending through the cover glass, and one or more aperture edge regions 1110B, 1110C each adjacent to a respective one the apertures 1130B, 1130C. The selectively chemically strengthened surface region may further comprise the aperture edge regions 1110B, 1110C of the cover glass, each a respective width dimension, w.

Additional information on selective glass strengthening may be contained in U.S. patent application Ser. No. 12/847,926, filed Jul. 30, 2010, and entitled "ELECTRONIC DEVICE HAVING SELECTIVITY STRENGTHENING GLASS COVER GLASS," which is hereby incorporated herein by reference.

Additional information on strengthening variable thickness glass is contained in U.S. Provisional Patent Application No. 61/453,398, filed Mar. 16, 2011, and entitled "STRENGTHENING VARIABLE THICKNESS GLASS", which is hereby incorporated herein by reference; and in U.S. patent application Ser. No. 13/235,036, filed concurrently herewith, and entitled "STRENGTHENING VARIABLE THICKNESS GLASS", which is hereby incorporated herein by reference The advantages of the invention are numerous. Different aspects, embodiments or implementations may yield one or more of the following advantages. One advantage is that cover glass can be selectively strengthened in high damage risk areas such as edge extremity regions. Another advantage is that cover glass can be selectively strengthened adjacent to apertures where damage risk may be higher, due to defects introduced in machining or grinding in forming of the apertures. Another advantage is that high damage risk areas can be strengthened while limiting increases in overall central tension of the cover glass, and possible deleterious effects of over strengthening, by selectively strengthening selected portions of the cover glass.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A portable electronic device comprising:
a touch-sensitive layer; and
an enclosure at least partially surrounding the touch-sensitive layer and comprising:
a housing; and
a glass member coupled to the housing and defining an exterior surface of the enclosure, the glass member comprising:
an exterior compressive stress region extending from an exterior surface of the glass member to a first depth;
an interior compressive stress region extending from an interior surface of the glass member to a second depth; and
a peripheral compressive stress region extending between the exterior compressive stress region and the interior compressive stress region and extending from an edge surface of the glass member to a third depth that is greater than the first depth and the second depth.

2. The portable electronic device of claim 1, wherein:
the exterior surface of the glass member is a first exterior surface; and
an exterior portion of the peripheral compressive stress region extends from a second exterior surface of the glass member.

3. The portable electronic device of claim 2, wherein:
the interior surface of the glass member is a first interior surface; and
an interior portion of the peripheral compressive stress region further extends from a second interior surface of the glass member.

4. The portable electronic device of claim 3, wherein:
the glass member further defines a peripheral tensile stress region between the exterior and interior portions of the peripheral compressive stress region; and
a central tension of the peripheral tensile stress region is greater than a central tension of a tensile stress region between the exterior and the interior compressive stress regions.

5. The portable electronic device of claim 1, wherein the first depth is substantially equal to the second depth.

6. The portable electronic device of claim 1, wherein:
the portable electronic device further comprises a display stack; and
the touch-sensitive layer is included in the display stack.

7. The portable electronic device of claim 1, wherein:
the exterior compressive stress region has a first peak compressive stress;
the interior compressive stress region has a second peak compressive stress; and
the peripheral compressive stress region has a third peak compressive stress that is substantially the same as the first and the second peak compressive stress.

8. A portable electronic device comprising:
an enclosure including a glass member defining a front surface, a rear surface, and an edge surface extending between the front surface and the rear surface, the glass member comprising:
a front ion-exchanged layer extending from at least a portion of the front surface and defining a front compressive stress region having a first depth from the front surface;
a rear ion-exchanged layer extending from at least a portion of the rear surface and defining a rear compressive stress region having a second depth from the rear surface; and
a peripheral ion-exchanged layer extending from the edge surface and defining a peripheral compressive stress region having a third depth from the edge surface that is greater than the first depth and the second depth; and
a display positioned within the enclosure and below the glass member.

9. The portable electronic device of claim 8, wherein a peak compressive stress of the peripheral compressive stress region is greater than a peak compressive stress of the rear compressive stress region.

10. The portable electronic device of claim 9, wherein the first depth is greater than the second depth.

11. The portable electronic device of claim 8, wherein the glass member is formed of an aluminosilicate glass.

12. The portable electronic device of claim 11, wherein each of the front ion-exchanged layer, the rear ion-exchanged layer, and the peripheral ion-exchanged layer includes potassium ions.

13. The portable electronic device of claim 8, wherein the edge surface defines a rounded transition between the front surface and a side surface of the glass member.

14. The portable electronic device of claim 8, wherein:
the enclosure further comprises a housing coupled to the glass member; and
the edge surface of the glass member is proximate a side surface of the housing.

15. A portable electronic device comprising:
a camera; and
an enclosure at least partially surrounding the camera and including a glass member defining:
a first compressive stress region extending along an exterior surface of the glass member and having a first depth from the exterior surface;
a second compressive stress region extending along an interior surface of the glass member and having a second depth from the interior surface; and
a third compressive stress region extending along an edge surface of the glass member and having a third depth from the edge surface that is greater than the first depth and the second depth.

16. The portable electronic device of claim 15, wherein the edge surface extends around a periphery of the glass member.

17. The portable electronic device of claim 16, wherein:
the glass member defines an aperture surface that defines an aperture extending through the glass member; and
the camera is positioned adjacent the aperture.

18. The portable electronic device of claim 17, wherein the glass member further defines a fourth compressive stress region extending from the aperture surface to a fourth depth into the glass member.

19. The portable electronic device of claim 18, wherein the fourth depth is greater than the first depth and the second depth.

20. The portable electronic device of claim 15, wherein the glass member has a thickness less than 1 mm.

* * * * *